US006407536B1

(12) United States Patent
Ogusa

(10) Patent No.: US 6,407,536 B1
(45) Date of Patent: Jun. 18, 2002

(54) POWER CONVERSION EQUIPMENT AND CONTROL DEVICE FOR THE POWER CONVERSION EQUIPMENT

(75) Inventor: Shinichi Ogusa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/984,002

(22) Filed: Oct. 26, 2001

(30) Foreign Application Priority Data

May 23, 2001 (JP) ....................................... 2001-153636

(51) Int. Cl.[7] .............................. G05F 1/70; G05F 3/00
(52) U.S. Cl. ....................................... 323/207; 323/910
(58) Field of Search ................................ 323/207, 910, 323/217, 215

(56) References Cited

U.S. PATENT DOCUMENTS

| | | | | |
|---|---|---|---|---|
| 4,072,880 A | * | 2/1978 | Oshima et al. | 323/321 |
| 4,101,819 A | * | 7/1978 | Maeda et al. | 323/320 |
| 4,333,046 A | * | 6/1982 | Lee | 323/231 |
| 5,128,604 A | * | 7/1992 | Caen | 323/219 |

FOREIGN PATENT DOCUMENTS

| | | |
|---|---|---|
| JP | 11-41812 | 2/1999 |

* cited by examiner

*Primary Examiner*—Bao Q. Vu
(74) *Attorney, Agent, or Firm*—Leydig, Voit & Mayer, Ltd.

(57) ABSTRACT

A power conversion equipment capable of dealing with an imbalance fault by changing characteristics of a filter for extracting negative-phase-sequence voltage in a steady state and at the time of a system fault, and a control device for the conversion equipment. The control device for power conversion equipments includes a negative-phase-sequence component extractor including first and second negative-phase-sequence component extraction filters having different extracting capabilities, and for extracting a negative-phase-sequence component from the two phase voltage using the first negative-phase-sequence component extraction filter in a steady state and extracting a negative-phase-sequence component from the two phase voltage using the second negative-phase-sequence component extraction filter in a transient state. In the negative-phase-sequence component extractor, a negative-phase-sequence component is extracted by the different negative-phase-sequence component extraction filters in the steady state and in the transient state, so that approprate control can be provided.

16 Claims, 16 Drawing Sheets

14
131
FIRST NEGATIVE-PHASE-SEQUENCE COMPONENT EXTRACTION FILTER
132
SECOND NEGATIVE-PHASE-SEQUENCE COMPONENT EXTRACTION FILTER
133
FIRST NEGATIVE-PHASE-SEQUENCE COMPONENT EXTRACTION FILTER
134
SECOND NEGATIVE-PHASE-SEQUENCE COMPONENT EXTRACTION FILTER
135
136
137
138
139
FILTER SWITCHING COMMAND CIRCUIT

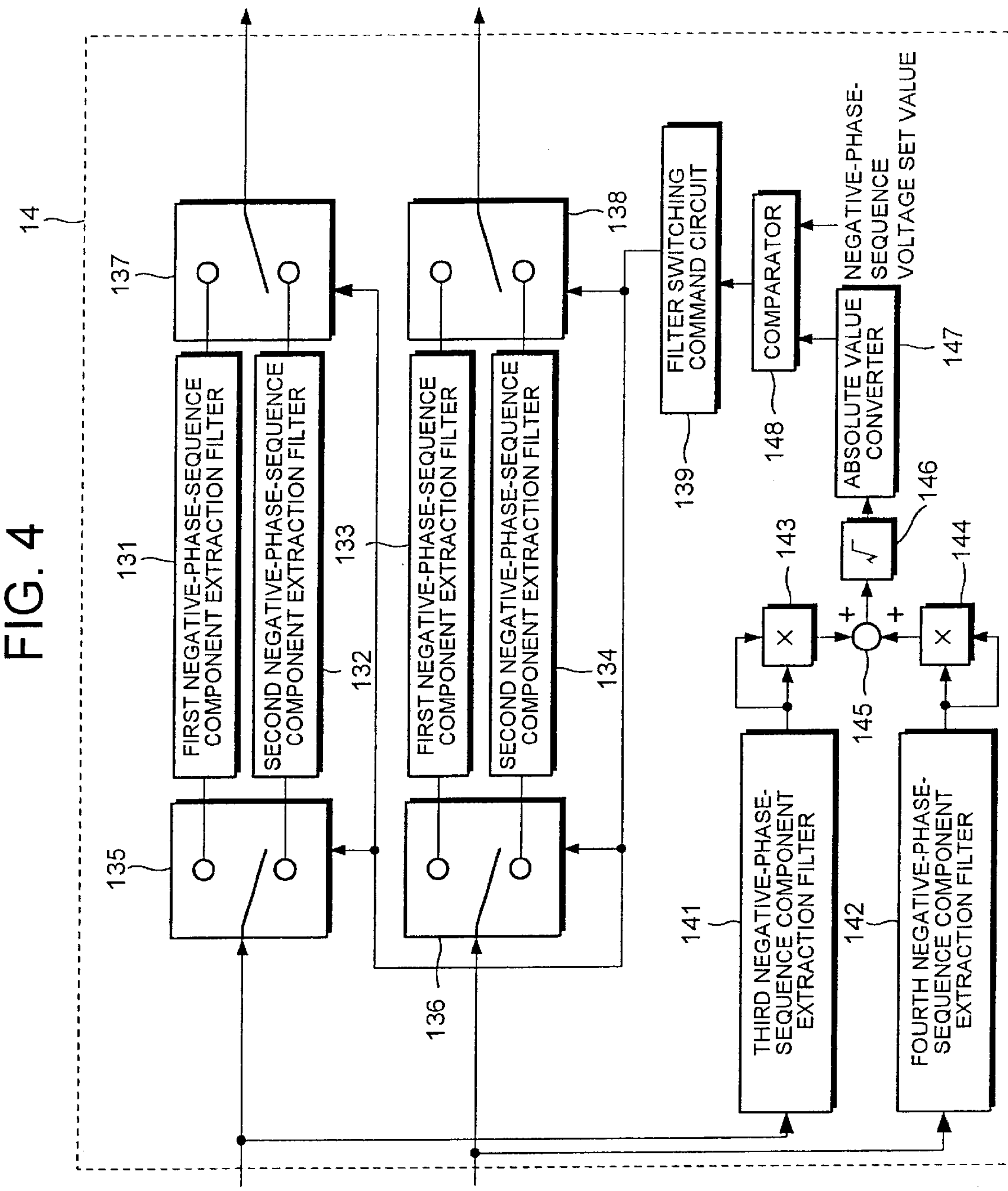
FIG. 4
14
131
FIRST NEGATIVE-PHASE-SEQUENCE COMPONENT EXTRACTION FILTER
132
SECOND NEGATIVE-PHASE-SEQUENCE COMPONENT EXTRACTION FILTER
133
FIRST NEGATIVE-PHASE-SEQUENCE COMPONENT EXTRACTION FILTER
134
SECOND NEGATIVE-PHASE-SEQUENCE COMPONENT EXTRACTION FILTER
135
136
137
138
139
FILTER SWITCHING COMMAND CIRCUIT
148
COMPARATOR
NEGATIVE-PHASE-SEQUENCE VOLTAGE SET VALUE
147
ABSOLUTE VALUE CONVERTER
146
143
145
144
141
THIRD NEGATIVE-PHASE-SEQUENCE COMPONENT EXTRACTION FILTER
142
FOURTH NEGATIVE-PHASE-SEQUENCE COMPONENT EXTRACTION FILTER 14
SECOND NEGATIVE-PHASE-SEQUENCE COMPONENT EXTRACTION FILTER
132
SECOND NEGATIVE-PHASE-SEQUENCE COMPONENT EXTRACTION FILTER
134
151
152
FIRST NEGATIVE-PHASE-SEQUENCE COMPONENT EXTRACTION FILTER
131
FIRST NEGATIVE-PHASE-SEQUENCE COMPONENT EXTRACTION FILTER
133
137
138
FILTER SWITCHING COMMAND CIRCUIT
139

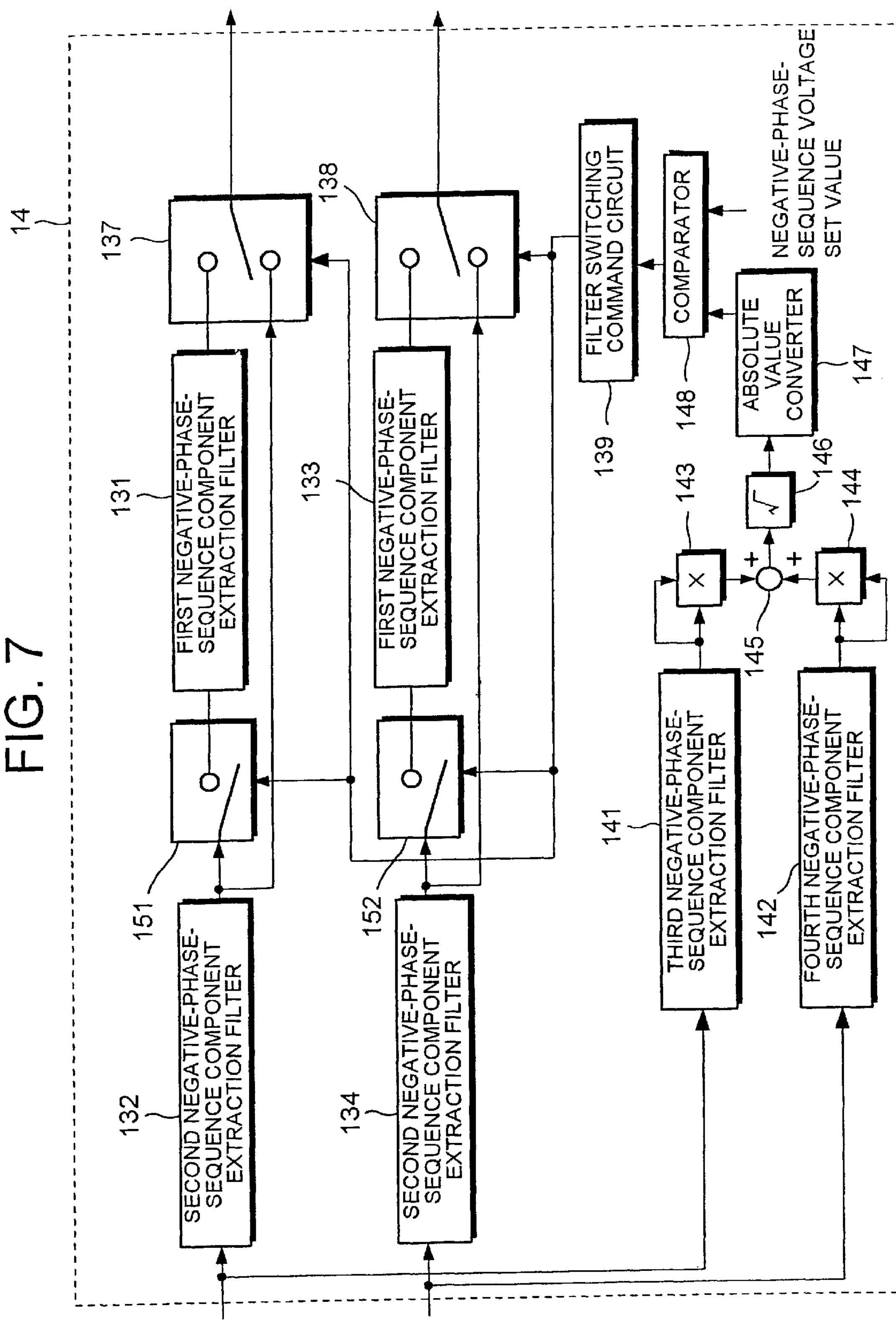
FIG. 7
14
FIRST NEGATIVE-PHASE-SEQUENCE COMPONENT EXTRACTION FILTER
131
FIRST NEGATIVE-PHASE-SEQUENCE COMPONENT EXTRACTION FILTER
133
SECOND NEGATIVE-PHASE-SEQUENCE COMPONENT EXTRACTION FILTER
132
SECOND NEGATIVE-PHASE-SEQUENCE COMPONENT EXTRACTION FILTER
134
THIRD NEGATIVE-PHASE-SEQUENCE COMPONENT EXTRACTION FILTER
141
FOURTH NEGATIVE-PHASE-SEQUENCE COMPONENT EXTRACTION FILTER
142
137
138
151
152
FILTER SWITCHING COMMAND CIRCUIT
139
COMPARATOR
148
ABSOLUTE VALUE CONVERTER
147
NEGATIVE-PHASE-SEQUENCE VOLTAGE SET VALUE
143
144
145
146
+
+

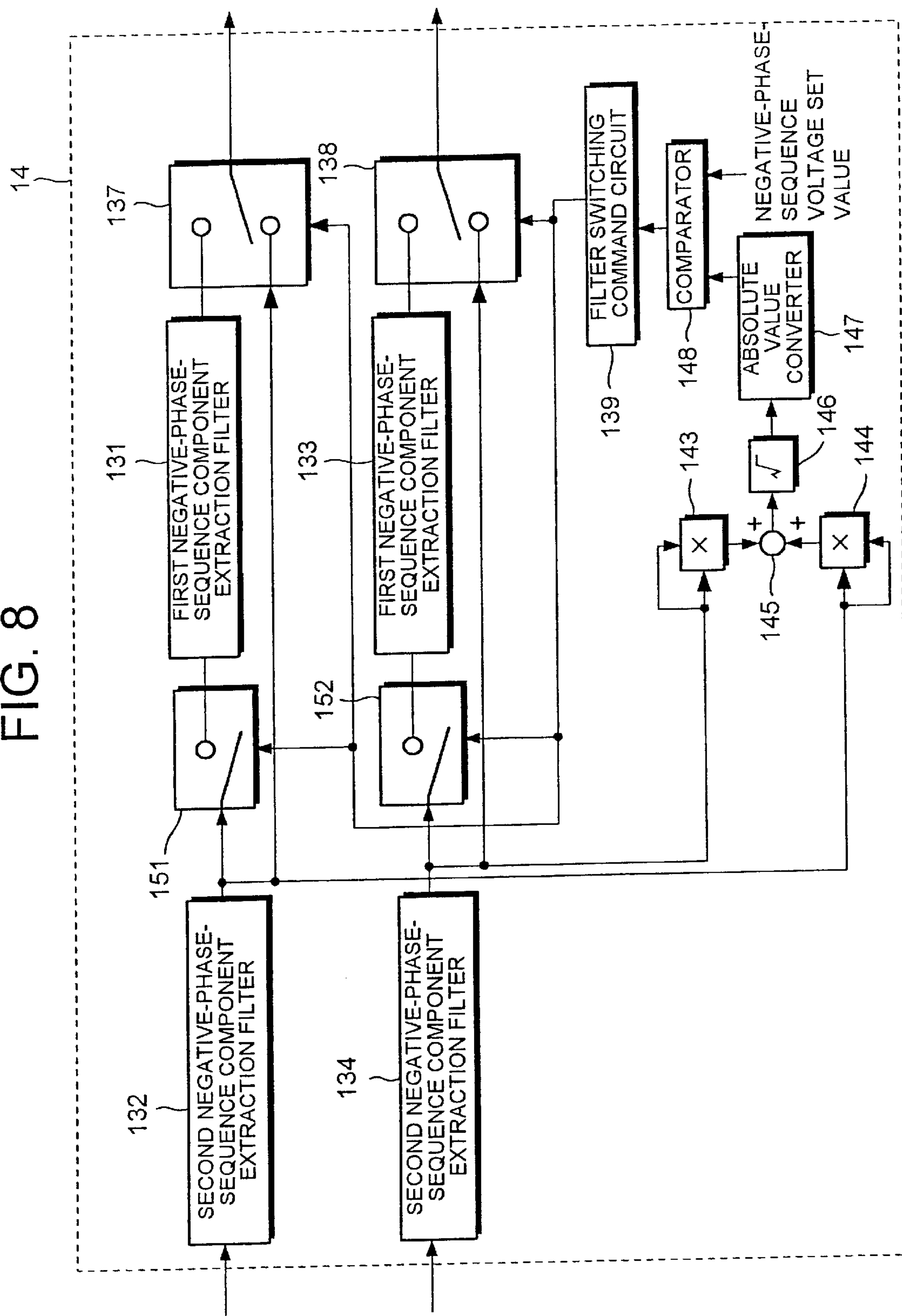
FIG. 8
14
137
138
FIRST NEGATIVE-PHASE-SEQUENCE COMPONENT EXTRACTION FILTER
131
133
FIRST NEGATIVE-PHASE-SEQUENCE COMPONENT EXTRACTION FILTER
FILTER SWITCHING COMMAND CIRCUIT
139
COMPARATOR
148
NEGATIVE-PHASE-SEQUENCE VOLTAGE SET VALUE
ABSOLUTE VALUE CONVERTER
147
146
143
144
145
151
152
SECOND NEGATIVE-PHASE-SEQUENCE COMPONENT EXTRACTION FILTER
132
SECOND NEGATIVE-PHASE-SEQUENCE COMPONENT EXTRACTION FILTER
134

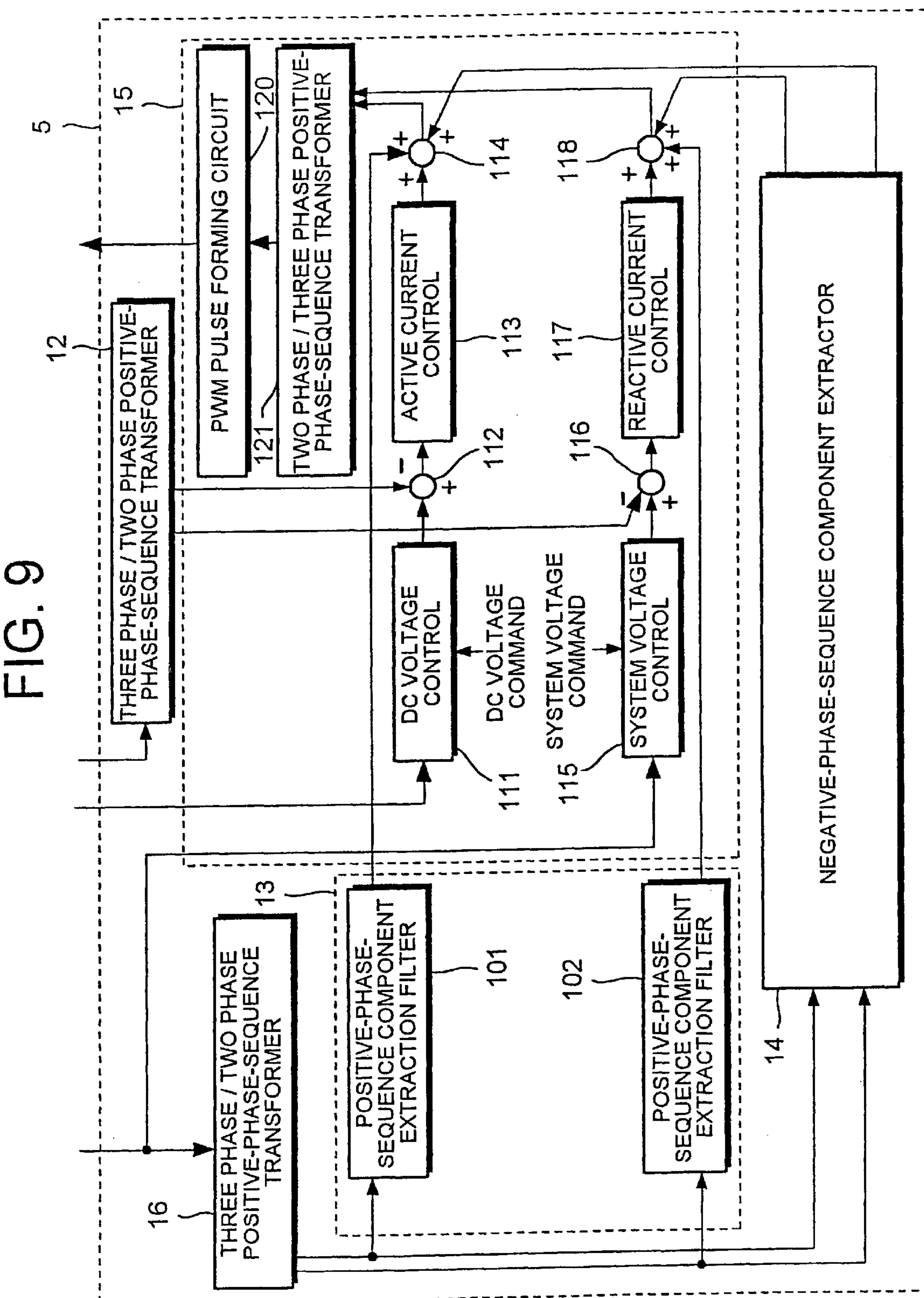
FIG. 9
5
15
12
THREE PHASE / TWO PHASE POSITIVE-PHASE-SEQUENCE TRANSFORMER
PWM PULSE FORMING CIRCUIT
120
121
TWO PHASE / THREE PHASE POSITIVE-PHASE-SEQUENCE TRANSFORMER
ACTIVE CURRENT CONTROL
113
114
112
DC VOLTAGE CONTROL
111
DC VOLTAGE COMMAND
SYSTEM VOLTAGE COMMAND
SYSTEM VOLTAGE CONTROL
115
116
REACTIVE CURRENT CONTROL
117
118
NEGATIVE-PHASE-SEQUENCE COMPONENT EXTRACTOR
14
13
POSITIVE-PHASE-SEQUENCE COMPONENT EXTRACTION FILTER
101
POSITIVE-PHASE-SEQUENCE COMPONENT EXTRACTION FILTER
102
THREE PHASE / TWO PHASE POSITIVE-PHASE-SEQUENCE TRANSFORMER
16

14
137
138
161
FIRST NEGATIVE-PHASE-SEQUENCE COMPONENT EXTRACTION FILTER
162
SECOND NEGATIVE-PHASE-SEQUENCE COMPONENT EXTRACTION FILTER
163
FIRST NEGATIVE-PHASE-SEQUENCE COMPONENT EXTRACTION FILTER
164
SECOND NEGATIVE-PHASE-SEQUENCE COMPONENT EXTRACTION FILTER
135
136
139
FILTER SWITCHING COMMAND CIRCUIT

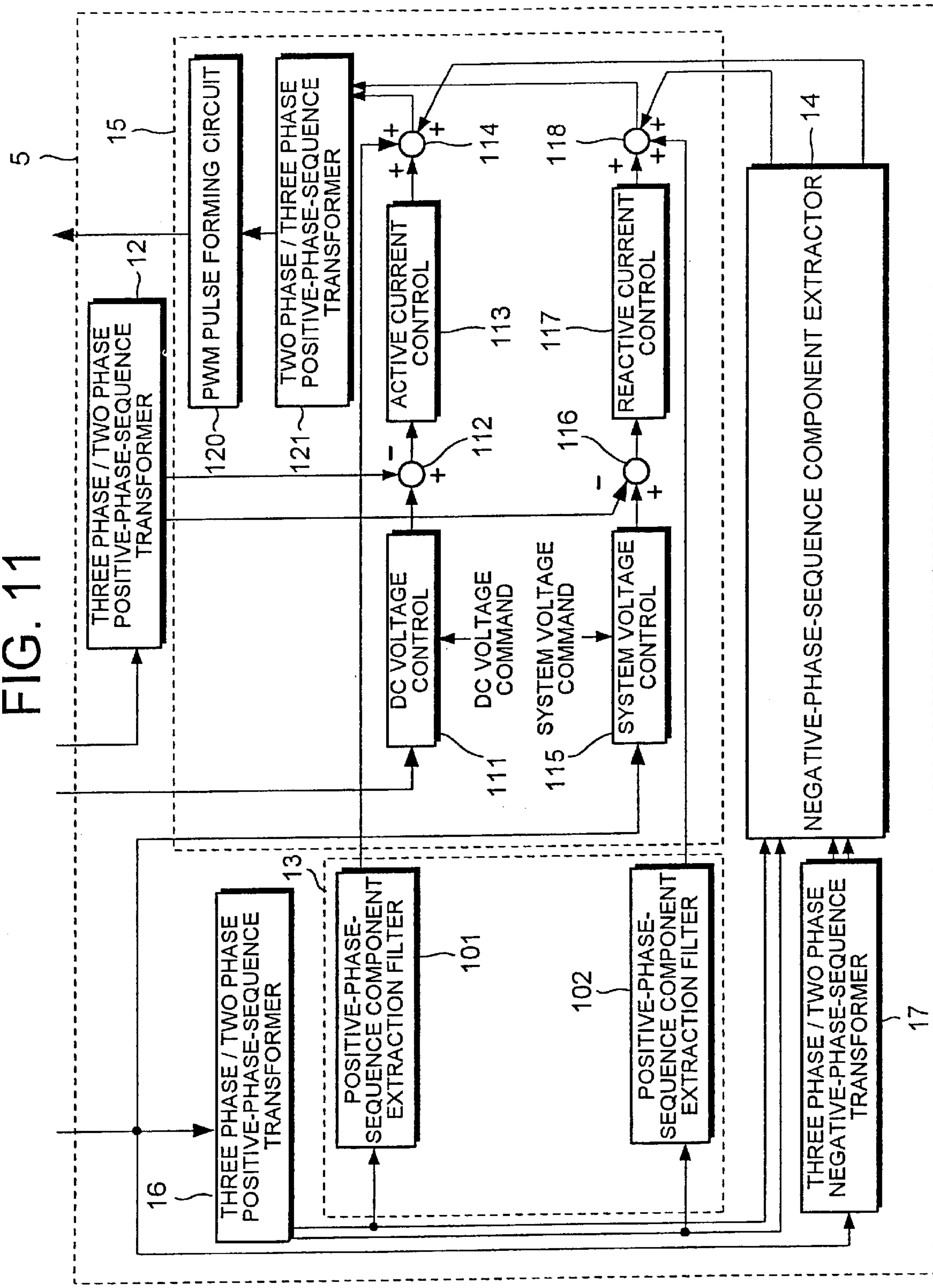

FIG. 11
5
15
12
THREE PHASE / TWO PHASE POSITIVE-PHASE-SEQUENCE TRANSFORMER
PWM PULSE FORMING CIRCUIT
120
TWO PHASE / THREE PHASE POSITIVE-PHASE-SEQUENCE TRANSFORMER
121
ACTIVE CURRENT CONTROL
113
114
112
DC VOLTAGE CONTROL
111
DC VOLTAGE COMMAND
SYSTEM VOLTAGE COMMAND
SYSTEM VOLTAGE CONTROL
115
116
REACTIVE CURRENT CONTROL
117
118
NEGATIVE-PHASE-SEQUENCE COMPONENT EXTRACTOR
14
13
POSITIVE-PHASE-SEQUENCE COMPONENT EXTRACTION FILTER
101
POSITIVE-PHASE-SEQUENCE COMPONENT EXTRACTION FILTER
102
THREE PHASE / TWO PHASE POSITIVE-PHASE-SEQUENCE TRANSFORMER
16
THREE PHASE / TWO PHASE NEGATIVE-PHASE-SEQUENCE TRANSFORMER
17

14
137
138
139
FILTER SWITCHING COMMAND CIRCUIT
161
FIRST NEGATIVE-PHASE-SEQUENCE COMPONENT EXTRACTION FILTER
163
FIRST NEGATIVE-PHASE-SEQUENCE COMPONENT EXTRACTION FILTER
151
152
162
SECOND NEGATIVE-PHASE-SEQUENCE COMPONENT EXTRACTION FILTER
164
SECOND NEGATIVE-PHASE-SEQUENCE COMPONENT EXTRACTION FILTER

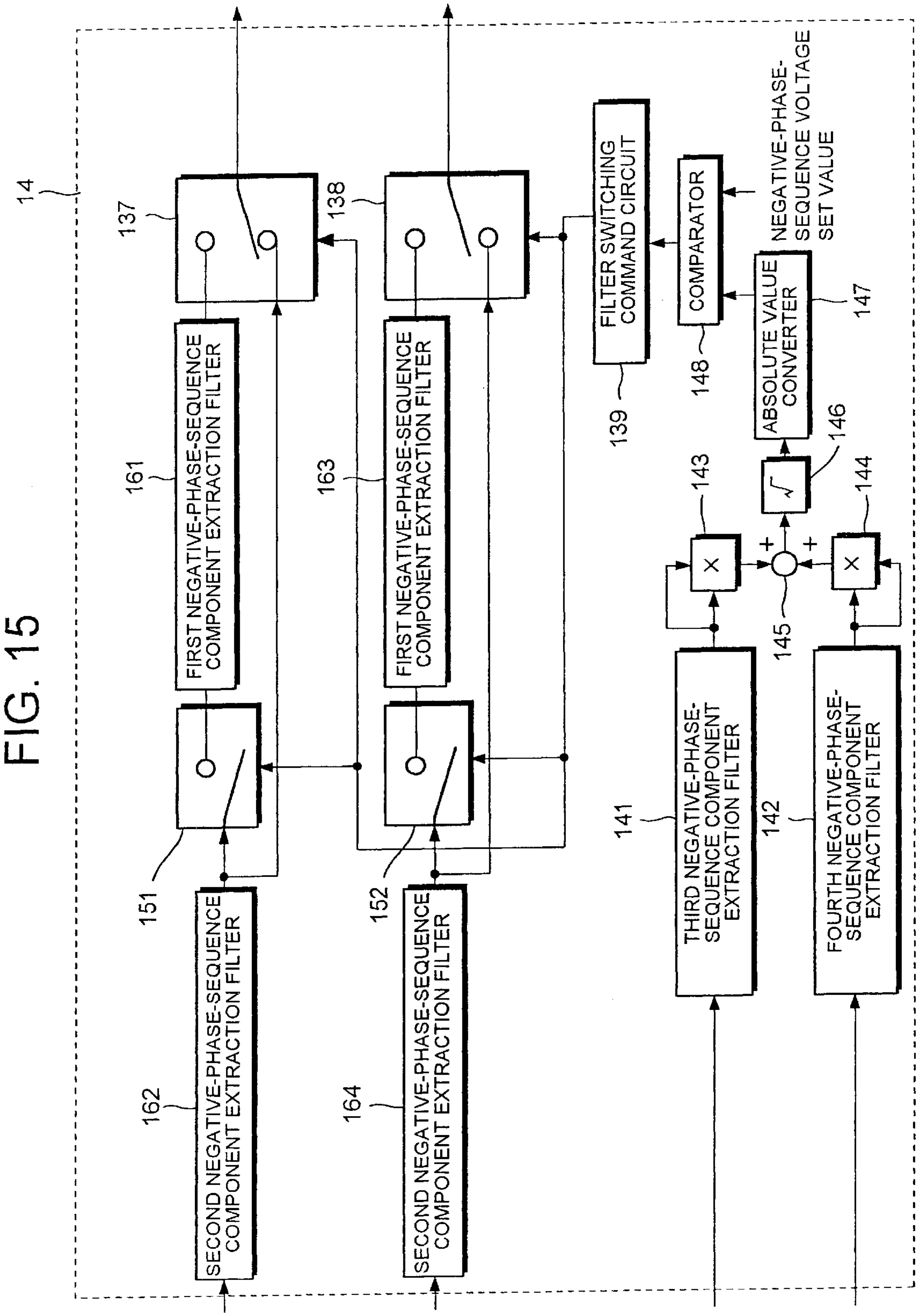
FIG. 15
14
137
138
FILTER SWITCHING COMMAND CIRCUIT
COMPARATOR
NEGATIVE-PHASE-SEQUENCE VOLTAGE SET VALUE
ABSOLUTE VALUE CONVERTER
147
148
139
146
161
FIRST NEGATIVE-PHASE-SEQUENCE COMPONENT EXTRACTION FILTER
163
FIRST NEGATIVE-PHASE-SEQUENCE COMPONENT EXTRACTION FILTER
143
144
145
151
152
141
THIRD NEGATIVE-PHASE-SEQUENCE COMPONENT EXTRACTION FILTER
142
FOURTH NEGATIVE-PHASE-SEQUENCE COMPONENT EXTRACTION FILTER
162
SECOND NEGATIVE-PHASE-SEQUENCE COMPONENT EXTRACTION FILTER
164
SECOND NEGATIVE-PHASE-SEQUENCE COMPONENT EXTRACTION FILTER

POWER CONVERSION EQUIPMENT AND CONTROL DEVICE FOR THE POWER CONVERSION EQUIPMENT

BACKGROUND OF THE INVENTION

1. Field of the Invention

The invention relates to a power conversion equipment and a control device of the power conversion equipment, and more particularly, to a power conversion equipment and a control device capable of preventing generation of over current at the time of a fault in an AC system.

2. Description of the Related Art

In a conventional control device for a power conversion equipment, generation of over current at the time of a fault in an AC system has been prevented by increasing the response speed of the controller for the power conversion equipment, that is, performing dq coordinate transformation of an output AC current of the conversion equipment and performing current control of a d-axis component and a q-axis component with non-interaction at high speed.

In this method, however, there is no control of a negative-phase-sequence component. Therefore, when AC voltage contains a negative-phase-sequence component due to an unbalanced fault or the like in an system, such negative-phase-sequence component is not reflected on a control output and causes, in some cases, flow of an over current due to the imbalance between voltages of the AC system and the conversion equipment.

Japanese Patent Laid-Open No. Hei 4-4812 discloses a power conversion equipment, in which generation of an over current due to an imbalance fault or the like is prevented by providing a negative-phase-sequence component detection circuit for detecting a negative-phase-sequence component using a band pass filter and controlling the power conversion equipment through detection of a negative-phase-sequence component by the negative-phase-sequence component detection circuit.

With the above-mentioned conventional control device for power conversion equipment, the filter for extracting a negative-phase-sequence component used in a steady state is the same as that used in a transient state on the assumption that any negative-phase-sequence component is not contained in a steady state. Therefore, the filter for extracting a negative-phase-sequence component in the transient state, as in an imbalance fault or the like, that is, the filter intended for the transient state, is also used in the steady state to extract a negative-phase-sequence component for control of the associated power conversion equipment.

Actually, a negative-phase-sequence component contained in a system voltage rapidly increases in a transient state as in an unbalancing system fault or the like. On the other hand, such a negative-phase-sequence component is almost never present but is present, on the order of several percent (%), in the steady state. Thus, negative-phase-sequence components in a steady state and in a transient state differ in generation and properties, so that, in order to extract a negative-phase-sequence component and control the conversion equipment in a suitable manner, appropriate filters must be used in the steady state and in the transient state, respectively.

However, in the above-mentioned conventional control device f or the power conversion equipment, the filter intended for the transient state is used in a steady state to extract a negative-phase-sequence component for control of the power conversion equipment, and so is not suitable for the steady state. Therefore, there is caused a problem that when a negative-phase-sequence component detected by the filter intended for the transient state is used to control the power conversion equipment in a steady state, control is not correctly performed and an instability is generated.

SUMMARY OF THE INVENTION

It is an object of the invention to provide a power conversion equipment capable of dealing with an unbalanced fault by changing characteristics of filters for extracting negative-phase-sequence voltage in a steady state and at the time of a system fault, respectively, and to provide a control device of the power conversion equipment.

Accordingly the invention provides a control device of a power conversion equipment comprising a three phase/two phase transformer for transforming three phase AC voltage of the power conversion equipment into two phase voltage, a positive-phase-sequence component extractor for extracting a positive-phase-sequence component from the two phase voltage, a negative-phase-sequence component extractor including first and second negative-phase-sequence component extraction filters having different extracting capabilities, for extracting a negative-phase-sequence component from the two phase voltage with the use of the first negative-phase-sequence component extraction filter in a steady state, and for extracting a negative-phase-sequence component from the two phase voltage with the use of the second negative-phase-sequence component extraction filter in a transient state, and a control signal generator for generating a control signal on the basis of the positive-phase-sequence component extracted by the positive-phase-sequence component extractor and the negative-phase-sequence component extracted by the negative-phase-sequence component extractor.

According to the invention, in the negative-phase-sequence component extractor, the first negative-phase-sequence component extraction filter is used to extract a negative-phase-sequence component from the two phase voltage in a steady state and the second negative-phase-sequence component extraction filter is used to extract a negative-phase-sequence component from the two phase voltage in a transient state, so that an appropriate control system can be provided, which is conformed to a system condition.

Preferably, the second negative-phase-sequence component extraction filter is one having a higher speed of response than that of the first negative-phase-sequence component extraction filter. In this case, it is possible to provide a control system, which is stable in the steady state and has an adequate speed of response at the time of sudden change in voltage, such as a fault in the system.

The three phase/two phase transformer may employ a three phase/two phase transformation reciprocal both phase transformer for transforming three phase AC voltage of the power conversion equipment into a positive-phase-sequence dq-axis component and an negative-phase-sequence dq-axis component, respectively. In this case, a negative-phase-sequence component appears as a direct current, so that it can be easily extracted.

The negative-phase-sequence component extractor may comprise a filter switching unit for performing switchover of the first negative-phase-sequence component extraction filter and the second negative-phase-sequence component extraction filter on the basis of a negative-phase-sequence voltage. In this case, it is possible to provide a control system, which is free of malfunctioning at the time of an unbalanced fault and has a high speed of response when an unbalanced fault occurs in the system.

The negative-phase-sequence component extractor may extract a negative-phase-sequence component in a steady state with the use of both the first negative-phase-sequence component extraction filter and the second negative-phase-sequence component extraction filter. In this case, it is possible to more accurately extract a negative-phase-sequence component in a steady state as compared with the case where only the first negative-phase-sequence component extraction filter is used.

BRIEF DESCRIPTION OF THE DRAWINGS

FIG. 4 is a block diagram showing a negative-phase-sequence component extractor in a control device for power conversion equipment according to an embodiment 2;

FIG. 7 is a block diagram showing a negative-phase-sequence component extractor in a control device of a power conversion equipment according to an embodiment 5;

FIG. 8 is a block diagram showing a negative-phase-sequence component extractor in a control device of a power conversion equipment according to an embodiment 6;

FIG. 9 is a view showing a control device of a power conversion equipment according to an embodiment 7;

FIG. 11 is a block diagram showing a control device of a power conversion equipment according to an embodiment 8;

FIG. 15 is a block diagram showing a negative-phase-sequence component extractor in a control device of a power conversion equipment according to an embodiment 11.

DETAILED DESCRIPTION OF THE PREFERRED EMBODIMENTS

Embodiment 1

Figure 1:
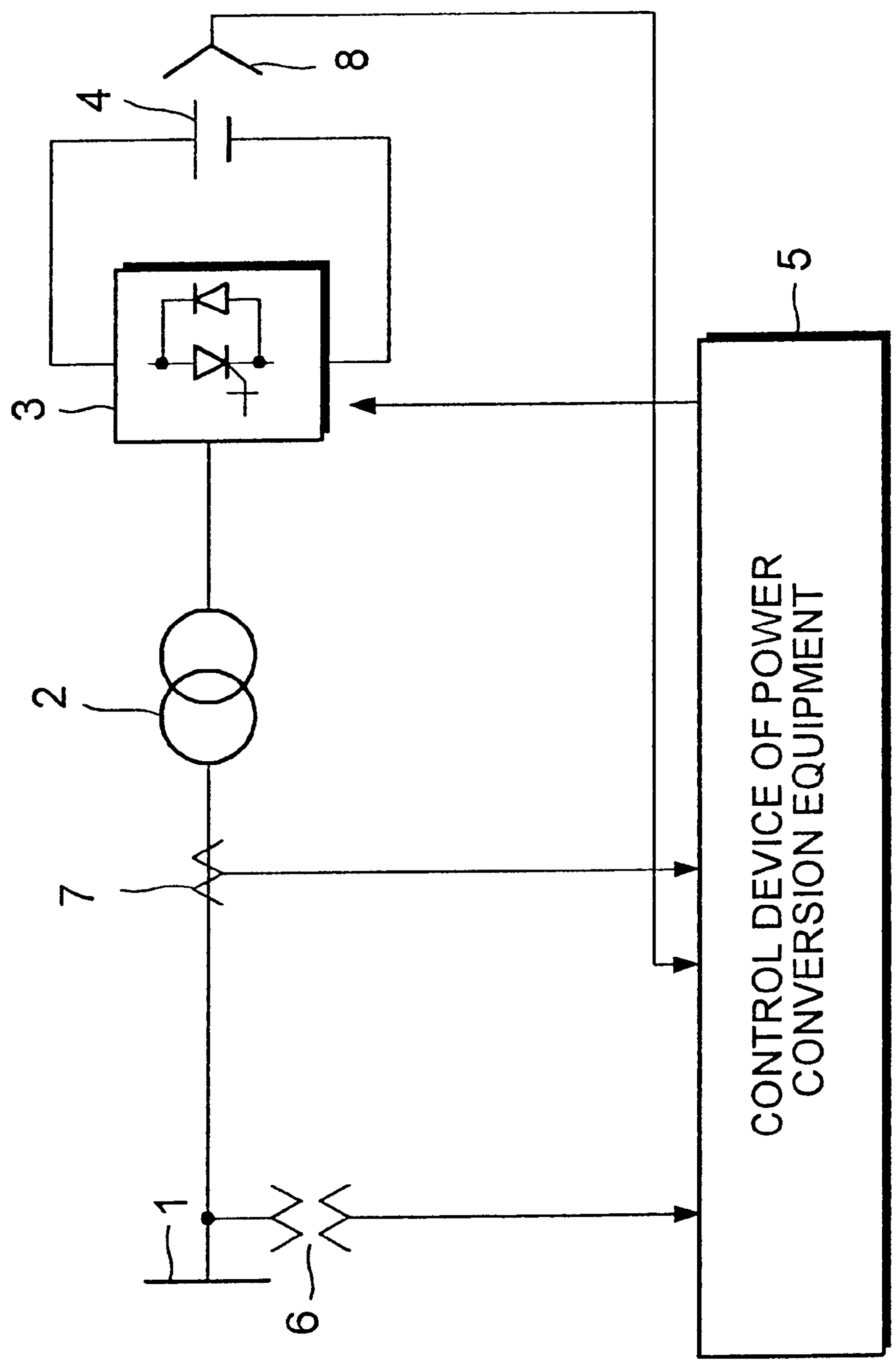
FIG. 1 is a view showing a power conversion equipment according to an embodiment 1.

FIG. 1 is a view showing a power conversion equipment according to an embodiment 1. As shown in the figure, the power conversion equipment is mainly composed of an AC voltage system 1, a transformer 2 for transforming a system voltage of the AC voltage system 1, a converter 3 for converting into a DC voltage the AC voltage transformed by the transformer 2, a DC condenser 4 for accumulating the DC voltage converted by the converter 3, a control device 5 of the power conversion equipment, and detectors for detecting various conditions of the power conversion equipment. While the power conversion equipment is explained, by way of example, a VAR system, other power conversion equipment such as DC power transmission equipment, BTB and the like may apply.

The detectors are mainly composed of an AC voltage sensor 6 for detecting AC voltage, a current sensor 7 for detecting current, and a DC voltage sensor 8 for detecting DC voltage of the DC condenser 4. The detectors detect the system voltage, current, and DC voltage, and the detected system voltage, current, and DC voltage are input into the control device 5. And the control device 5 controls the converter on the basis of such detected system voltage, current, and DC voltage.

An explanation will be given below to the control device 5 of the power conversion equipment.

Figure 2:
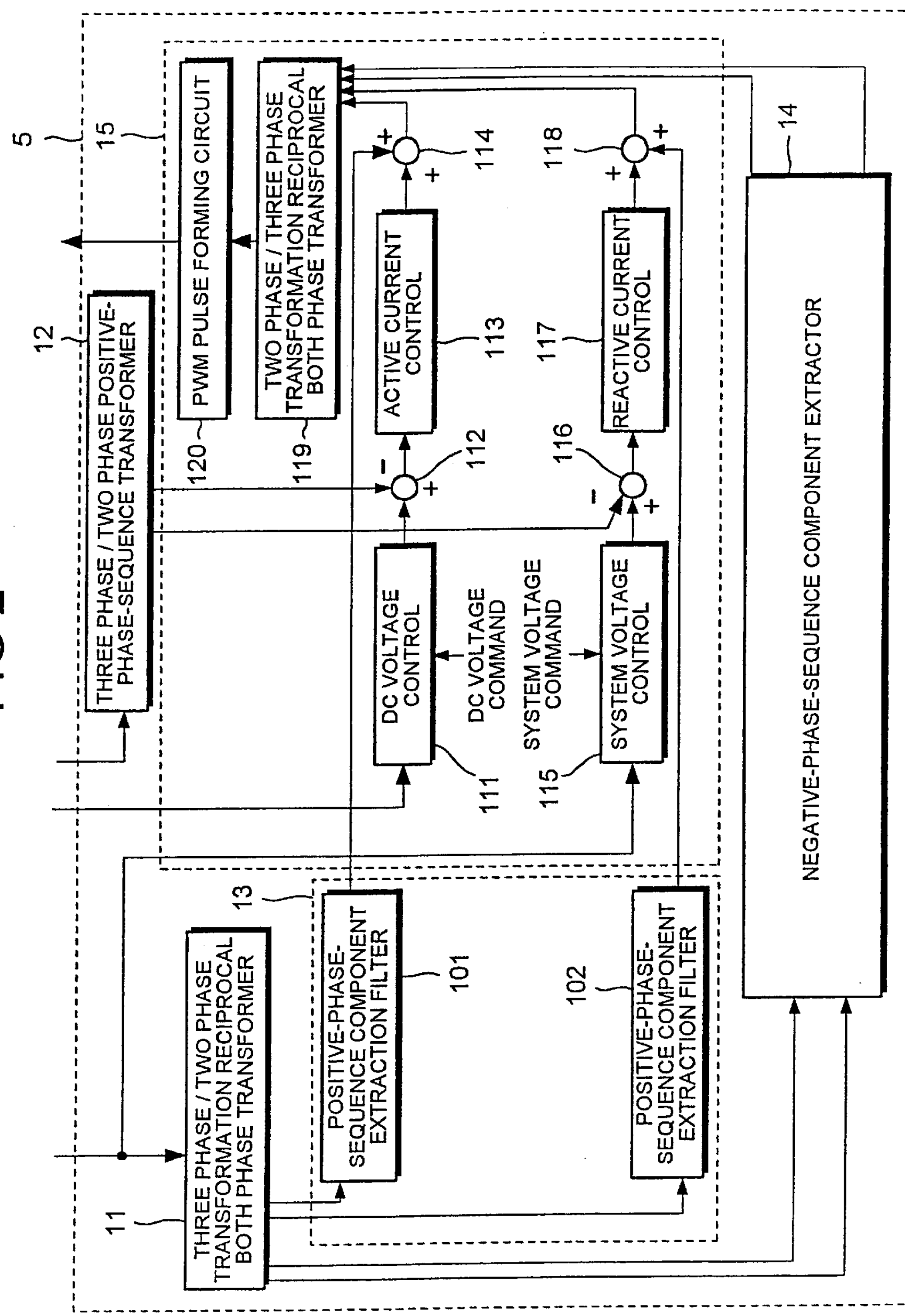
FIG. 2 is a block diagram showing in detail the control device of the power conversion equipment shown in FIG. 1.

FIG. 2 is a block diagram showing in detail the control device 5 of the power conversion equipment shown in FIG. 1. As shown in the figure, the control device 5 of the power conversion equipment is mainly composed of a three phase/two phase transformation reciprocal both phase transformer 11, a three phase/two phase positive-phase-sequence transformer 12, a positive-phase-sequence component extractor 13, a negative-phase-sequence component extractor 14, and a control signal generator 15.

In the control device 5, the three phase/two phase transformation reciprocal both phase transformer 11 converts three phase AC voltage detected by the AC voltage sensor 6 onto a positive-phase-sequence dq-axis and a negative-phase-sequence dq-axis, respectively. The positive-phase-sequence component extractor 13 extracts a positive-phase-sequence component from the voltage transformed on the positive-phase-sequence dq-axis. The negative-phase-sequence component extractor 14 extracts a negative-phase-sequence component from the voltage transformed on the negative-phase-sequence dq-axis. And the control signal generator 15 generates a control signal on the basis of the positive-phase-sequence component generated by the positive-phase-sequence component extractor 13 and the negative-phase-sequence component generated by the negative-phase-sequence component extractor 14.

The positive-phase-sequence component extractor 13 is composed of a positive-phase-sequence component extraction filter 101 for extracting a positive-phase-sequence component from voltage transformed on the positive-phase-sequence d-axis and output from the three phase/two phase transformation reciprocal both phase transformer 11, and a positive-phase-sequence component extraction filter 102 for extracting a positive-phase-sequence component from voltage transformed on the positive-phase-sequence q-axis and output from a three phase/two phase transformation reciprocal both phase transformer 11. It is preferable to use a filter of quick response as a filter for extracting a positive-phase-sequence component to reduce influences on a response of a controller exerted by the filter.

Next, an explanation will be given to the negative-phase-sequence component extractor 14.

Figure 3:
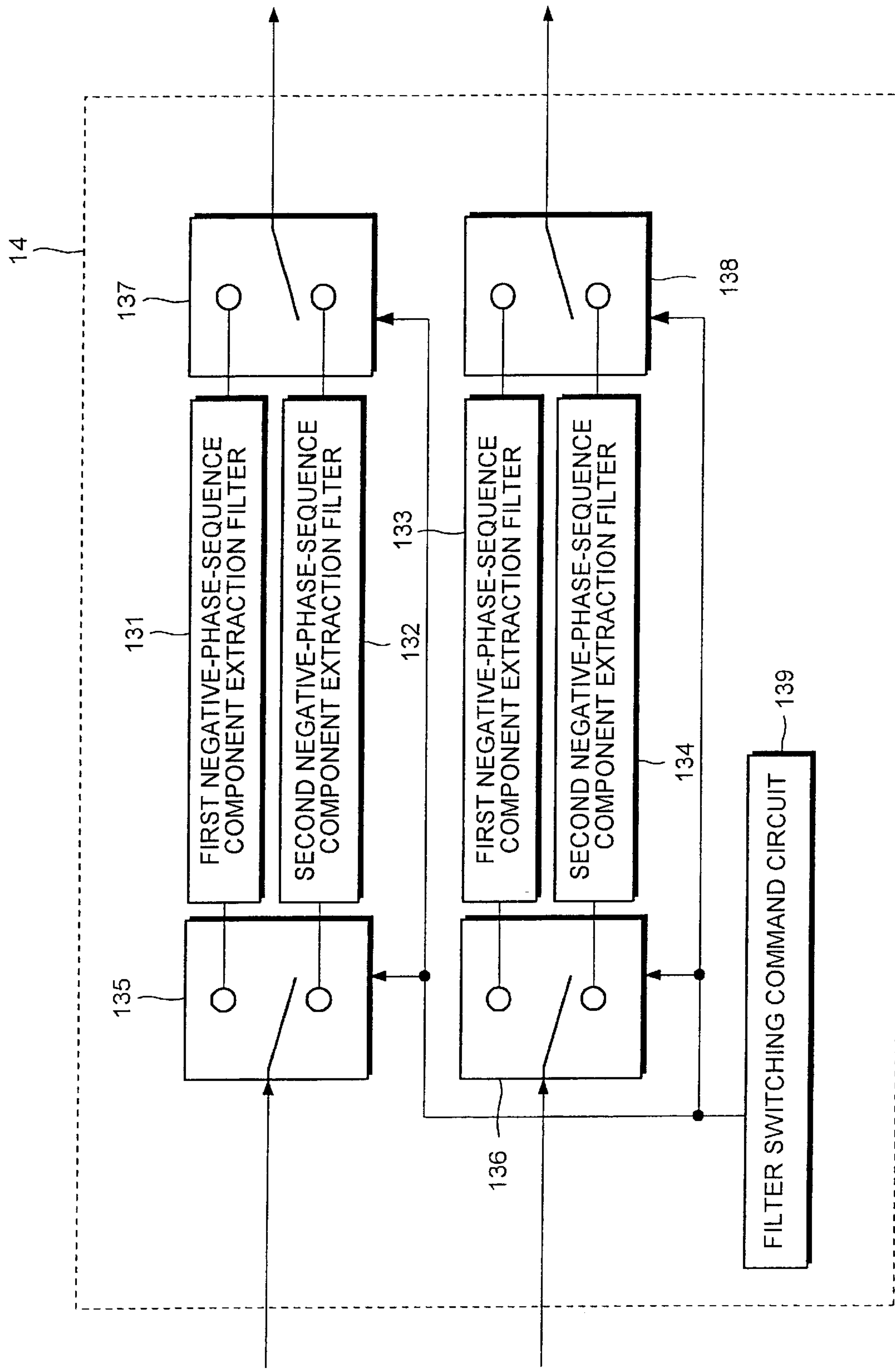
FIG. 3 is a block diagram showing in detail the constitution of the negative-phase-sequence component extractor shown in FIG. 2.

FIG. 3 is a block diagram showing in detail the constitution of the negative-phase-sequence component extractor 14 shown in FIG. 2. As shown in FIG. 3, the negative-phase-sequence component extractor 14 is composed of first and second negative-phase-sequence component extraction filters 131, 132 with different capabilities for extracting negative-phase-sequence components from voltage transformed on the negative-phase-sequence d-axis and output from the three phase/two phase transformation reciprocal both phase transformer 11, first and second negative-phase-sequence component extraction filters 133, 134 with different capabilities for extracting negative-phase-sequence components from voltage transformed on the negative-phase-sequence q-axis, a filter switching command circuit 139 for generating a filter switching command, and switching units 135–138 for performing filter switching in response to a filter switching command.

The first negative-phase-sequence component extraction filters 131, 133 are ones for steady state, attaching importance to a capability for extracting a negative-phase-sequence component. The second negative-phase-sequence component extraction filters 132, 134 are ones for transient state, which are higher speed of response than that of the negative-phase-sequence component extraction filters for steady state.

Since voltage on the negative-phase-sequence dq-axis serves as an input signal in the embodiment 1, a negative-phase-sequence component appears as a direct current amount on the negative-phase-sequence dq-axis and a positive-phase-sequence component appears as a double frequency component of a fundamental wave thereon. Therefore, it is preferable to use a filter, for example, a low-pass filter such as a first-order lag filter, having a capability of removing a positive-phase-sequence component, as these filters for extracting a negative-phase-sequence component.

More specifically, a filter, of which time constant is set to a large value, for example, a value three times a cycle of a fundamental wave so as to enable completely removing a positive-phase-sequence component, may be used a negative-phase-sequence component extraction filters for steady state. A first-order lag filter, of which time constant is set to a small value, for example, a cycle of a fundamental wave of first-order lag filter, may be used as negative-phase-sequence component extraction filters for transient state.

A low-pass filter, a moving average filter, a band rejection filter for removing a double frequency component of a fundamental wave, or the like as well as the above-mentioned first-order lag filter may be used as negative-phase-sequence component extraction filters. Also, a combination of these filters connected in series may be used.

The negative-phase-sequence component extractor 14 extracts a negative-phase-sequence component in the following manner.

In a steady state, the switching units 135, 137 (136, 138) are connected to the first negative-phase-sequence component extraction filter 131 (133) to extract a negative-phase-sequence component with the first negative-phase-sequence component extraction filter 131 (133). Meanwhile, when the filter switching command circuit 139 detects a system fault, the switching units 135, 137 (136, 138) perform switching so as to be connected to the second negative-phase-sequence component extraction filter 132 (134). As a result, a negative-phase-sequence component is extracted by the second negative-phase-sequence component extraction filter 132 (134) in a transient state.

Also, voltage on the negative-phase-sequence d-axis is extracted by the first and second negative-phase-sequence component extraction filters 131, 132, and voltage on the negative-phase-sequence q-axis is extracted by the first and second negative-phase-sequence component extraction filters 133, 134.

Switching of filters may be made when the filter switching command circuit 139 detects a system fault by using a circuit which detects a system fault by monitoring a system voltage or a circuit which detects a system fault by monitoring an error between a current command of the converter and a current actually detected.

The extraction of a negative-phase-sequence component is made by removing a positive-phase-sequence component and extracting only a negative-phase-sequence component. At this time, if removal of a positive-phase-sequence component is insufficient and a negative-phase-sequence component cannot be detected thereby with adequate accuracy, a part of the controller related to a negative-phase-sequence voltage interferes with a positive-phase-sequence component to cause a malfunction so that the controller becomes unstable. In the embodiment, however, the extraction is performed with the use of the first negative-phase-sequence component extraction filters in a steady state, so that negative-phase-sequence components of voltage transformed on the negative-phase-sequence d-axis and on the negative-phase-sequence q-axis can be extracted with adequate accuracy.

Meanwhile, if the extraction is performed with use of the first filter in a transient state, the controller cannot obtain adequate response of the first filter upon sudden voltage change of a negative-phase-sequence component since the response of such first filter is slow. In this embodiment, however, second negative-phase-sequence component extraction filters having a high speed of response are used in a transient state. Therefore, the response of the controller does not delay to the response of the negative-phase-sequence component and an over current does not flow in the converter, so that an appropriate control is effected.

The second negative-phase-sequence component extraction filters are inferior in accuracy of detection to the first negative-phase-sequence component extraction filters, but since voltage at the time of unbalanced fault is decreased in a positive-phase-sequence and increased in a negative-phase-sequence component, the extraction of a negative-phase-sequence component can be adequately performed even if the detecting accuracy of the filter is low as compared with that in a steady state.

Next, an explanation will be given to the control signal generator 15.

As shown in FIG. 2, the control signal generator 15 is composed of a DC voltage control 111, a subtracter 112, an active current control 113, an adder 114, a system voltage control 115, a subtracter 116, a reactive current control 117, an adder 118, a two phase/three phase transformation reciprocal both phase transformer 119, and a PWM pulse generating circuit 120.

A DC voltage command and DC voltage detected by the DC voltage sensor 8 are input into the DC voltage control 111 to be subjected to a feedback control. The subtracter 112 subtracts a d-axis current (active component) transformed in the three phase/two phase positive-phase-sequence transformer 12 from an active current command output from the DC voltage control 111. And an output signal output from the subtracter 112 is input into the active current control 113 to be subjected to a feedback control. Further, an output signal output from the active current control 113 and a d-axis positive-phase-sequence component extracted in the positive-phase-sequence component extraction filter 101 are added to each other by the adder 114 to be subjected to a feedforward control.

Also, a system voltage command and a system voltage detected by the AC voltage sensor 6 are input into the system voltage control 115 to be subjected to a feedback control. The subtracter 116 subtracts a q-axis current (reactive component) transformed in the three phase/two phase positive-phase-sequence transformer 12 from an output signal from the system voltage control 115. And an output signal output from the subtracter 116 is input into the reactive current control 117 to be subjected to a feedback control. Further, an output signal output from the reactive current control 117 and q-axis positive-phase-sequence component extracted in the positive-phase-sequence component extraction filter 102 are added to each other by the adder 118 to be subjected to a feedforward control.

A d-axis output voltage command output from the adder 114, a q-axis voltage command output from the adder 118, a negative-phase-sequence d-axis voltage output from the switching unit 137 of the negative-phase-sequence component extractor 14, and a negative-phase-sequence q-axis voltage output from the switching unit 138 of the negative-phase-sequence component extractor 14 are input into the two phase/three phase transformation reciprocal both phase transformer 119 to be transformed into a three phase voltage command. The three phase voltage command is input into the PWM pulse generating circuit 120. The PWM pulse generating circuit 120 generates from an input signal a control pulse for the power conversion equipment, that is, a gate pulse for switching elements of the power conversion equipment, and output the same as a control signal.

In the embodiment, switching of the filters is carried out so that a negative-phase-sequence component is extracted with use of the filters having a high accuracy of detection, that is, filters for steady state in a steady state and with use of the filters having a high speed of response, that is, filters for transient state, at the time of sudden voltage change (transient state) such as a fault in the system. Therefore, it is possible to use the filters of appropriate characteristics in accordance with a state of the system, and to provide the control device which is stable in steady state and has an adequate speed of response at the time of sudden voltage change such as a system fault.

Embodiment 2

While in the embodiment 1, the switching units are switched over upon detection of a system fault by using a circuit which detects a system fault by monitoring a system voltage or a circuit which detects a system fault by monitoring a difference between a current command of the converter and a current actually detected, switching units in the embodiment 2 are switched over in accordance with a negative-phase-sequence voltage as extracted.

FIG. 4 is a block diagram showing a negative-phase-sequence component extractor 14 in a control device of a power conversion equipment according to the embodiment 2. As shown in FIG. 4, the negative-phase-sequence component extractor 14 in the embodiment 2 includes, in addition to the negative-phase-sequence component extractor shown in FIG. 3, third and fourth negative-phase-sequence component extraction filters 141, 142, multipliers 143, 144, an adder 145, a square-root computing unit 146, an absolute value converter 147, and a comparator 148. Also, a filter switching command circuit 139 outputs a switching command in accordance with an output signal from the comparator 148.

The third and fourth negative-phase-sequence component extraction filters 141, 142 may be ones having an adequate speed of response, and may employ, for example, the second negative-phase-sequence component extraction filters explained in the embodiment 1. The embodiment 2 is the same as the embodiment 1 in other respects.

Switchover of the filters is carried out in the following manner.

Negative-phase-sequence components extracted by the third and fourth negative-phase-sequence component extraction filters 141, 142 are passed to the multipliers 143, 144, the adder 145, the square-root computing unit 146, and the absolute value converter 147 to find a magnitude of a negative-phase-sequence voltage. The comparator 148 compares the magnitude of the negative-phase-sequence voltage as calculated and a negative-phase-sequence voltage set value as preset with each other to input its result into the filter switching command circuit 139. Then the filter switching command circuit 139 judges a steady state or a transient state on the result of such comparison and outputs a switching command when changing to a transient state for a steady state.

In this embodiment, switchover of the negative-phase-sequence component extraction filters is carried out in accordance with a negative-phase-sequence voltage. Therefore, in addition to the effect obtained in the embodiment 1, it is possible to provide a control device which is free of malfunctioning at the time of an unbalanced fault and has a high speed of response when an unbalanced fault occurs in the system.

Embodiment 3

While in the embodiment 2, there are newly provided the third and fourth negative-phase-sequence component extraction filters for judging a change from the steady state to the transient state, a control device in the embodiment 3 uses the first and second negative-phase-sequence component extraction filters to judge the change of the state, thus reducing the number of filters.

Figure 5:
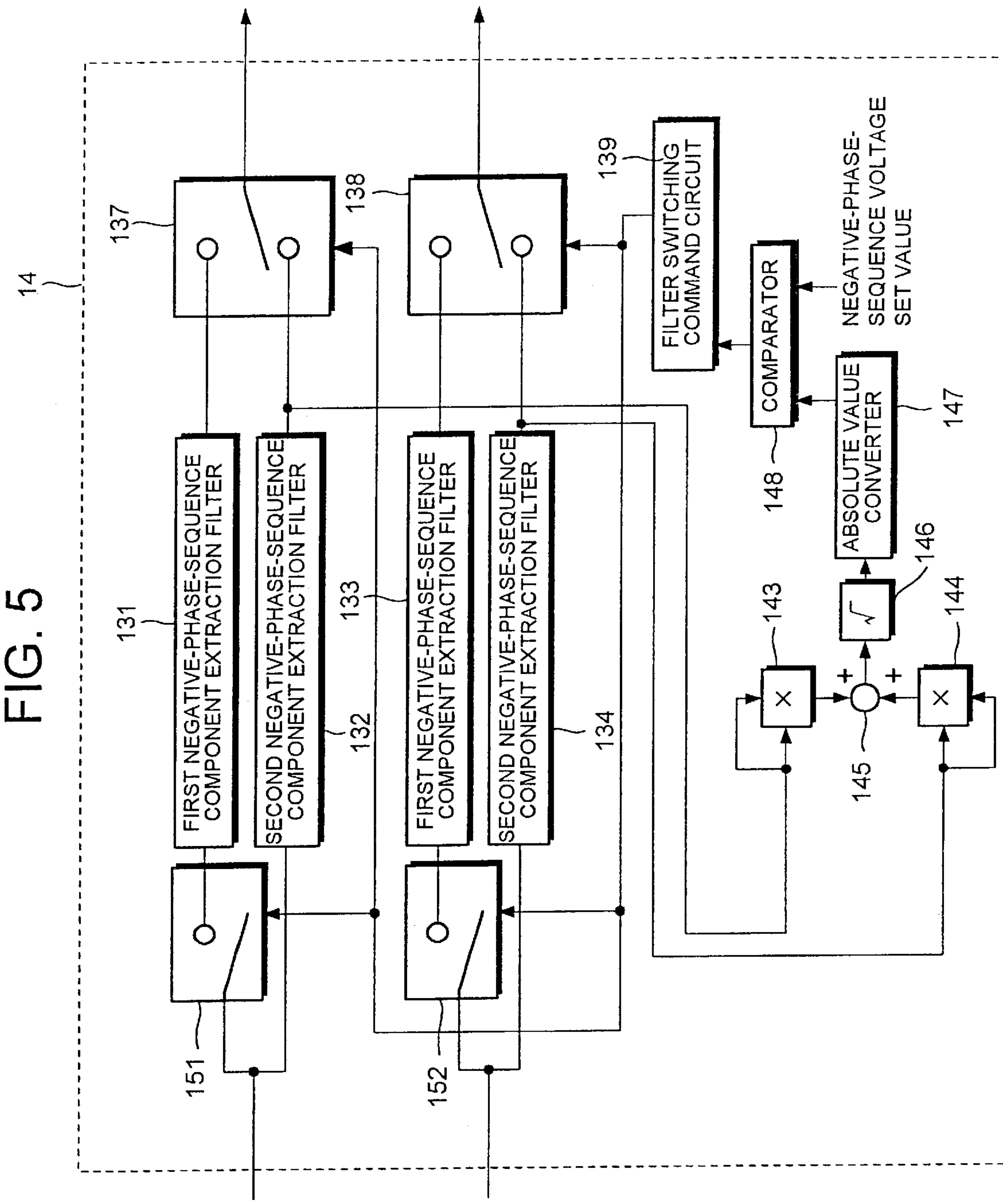
FIG. 5 is a block diagram showing a negative-phase-sequence component extractor in a control device for power conversion equipment according to an embodiment 3.

FIG. 5 is a block diagram showing a negative-phase-sequence component extractor 14 in a control device of a power conversion equipment according to an embodiment 3. As shown in FIG. 5, a switching unit 151 (152) effects only connection to and disconnection from the first negative-phase-sequence component extraction filter 131 (133) so that an output from the three phase/two phase transformation reciprocal both phase transformer 11 is always passed through the second negative-phase-sequence component extraction filter 132 (134). Switching actions of the switching units 151, 152 are made so as to be put in a non-connected state in a steady state and to be put in a connected state in a transient state.

Also, switchover of the first negative-phase-sequence component extraction filters and the second negative-phase-sequence component extraction filters is made in accordance with a value of a negative-phase-sequence voltage. The embodiment 3 is the same as the embodiment 2 in other respects.

In this manner, it is possible, in addition to the effect obtained in the embodiment 2, to reduce the number of filters as compared with the embodiment 2 to make a constitution simple.

Embodiment 4

While in the embodiment 1, the second negative-phase-sequence component extraction filters are not used in a steady state and only the first negative-phase-sequence component extraction filters are used to extract a negative-phase-sequence component, a control device in the embodiment 4 extracts a negative-phase-sequence component through the first and second negative-phase-sequence component extraction filters in a steady state.

Figure 6:
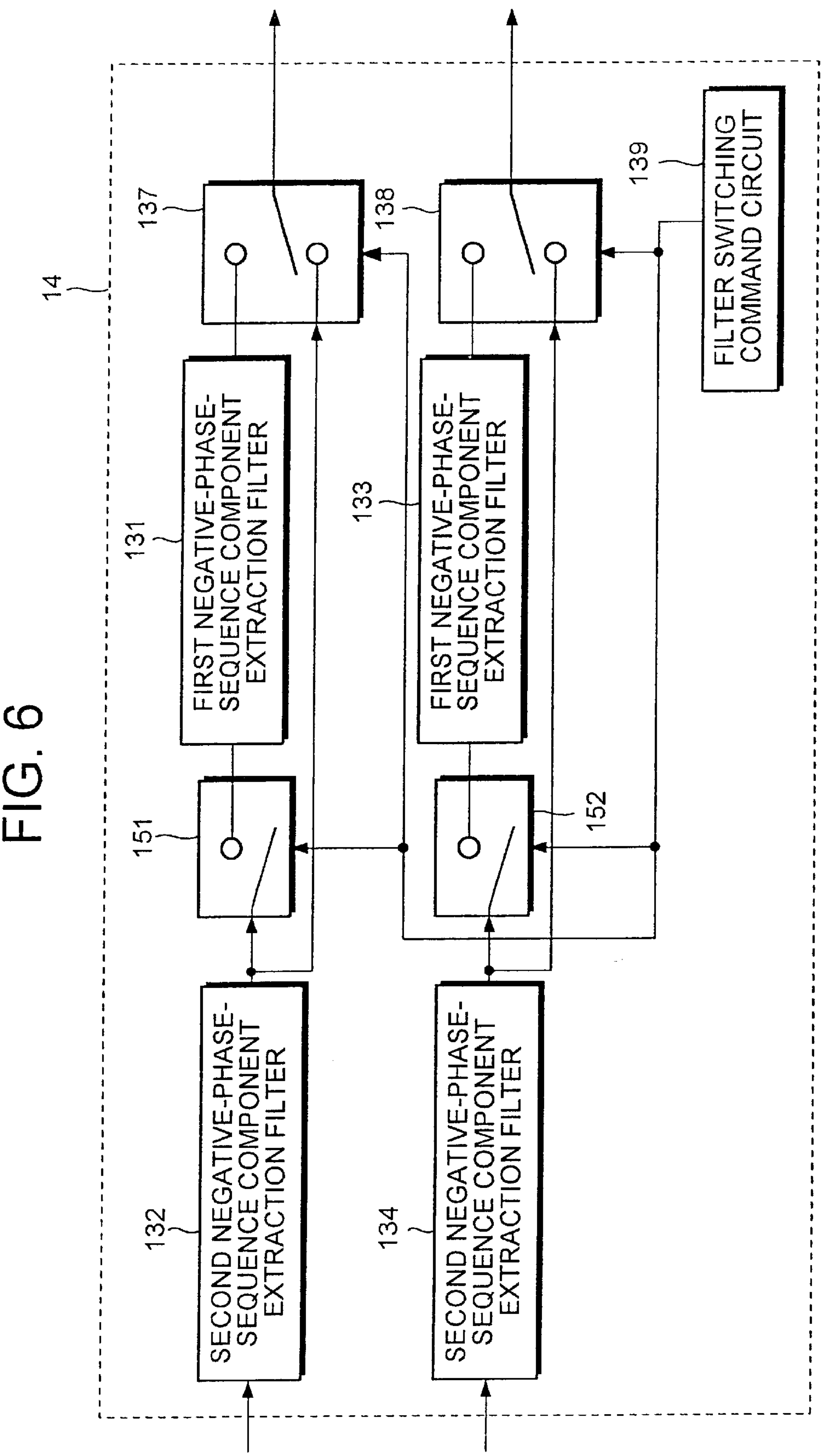
FIG. 6 is a block diagram showing a negative-phase-sequence component extractor in a control device for power conversion equipment according to an embodiment 4.

FIG. 6 is a block diagram showing a negative-phase-sequence component extractor 14 in a control device of a power conversion equipment according to the embodiment 4. As shown in FIG. 6, the second negative-phase-sequence component extraction filter 132 (134) is connected to a switching unit 151 (152) and to a switching unit 137 (138). As a result, there are ensured a path, along which an output signal from the second negative-phase-sequence component extraction filter 132 (134) is passed to the first negative-phase-sequence component extraction filter 131 (133), and a path, along which the output is input into the switching unit 137 (138) without passing through the first negative-phase-sequence component extraction filter 131 (133). The embodiment 4 is the same as the embodiment 1 in other respects.

In a steady state, the filter switching units are switched over so as to connect the filter switching unit 151 (152) to the first negative-phase-sequence component extraction filter 131 (133), to put in a connected state. As a result, a negative-phase-sequence component is extracted by the first and second negative-phase-sequence component extraction filters 131, 132 (133, 134) together.

Meanwhile, in a transient state, the filter switching units are switched over so as to connect the filter switching unit 137 (138) to a side of the second negative-phase-sequence component extraction filter 132 (134), to put in a non-connected state. As a result, a negative-phase-sequence component is extracted by only the second negative-phase-sequence component extraction filter 132 (134) without passing through the first negative-phase-sequence component extraction filter 131 (133). A filter switching command may be issued by detecting a fault in the system in the same manner as in the embodiment 1.

The first and second filters may be the same as those in the embodiment 1 to be used. Moreover, it is preferable to use the filters connected in series to be enhanced in the capability of removing a positive-phase-sequence component with a view to enhancing the capability of extracting a negative-phase-sequence component in a steady state.

With this embodiment, both the first and second filters are used for extraction of a negative-phase-sequence component in a steady state. Therefore, it is possible, in addition to the effect obtained in the embodiment 1, to more accurately extract a negative-phase-sequence component in a steady state. Also, since extraction of a negative-phase-sequence component can be made by the first and second filters in combination in a steady state, adequate detection is enabled even if the first filter of somewhat degraded accuracy of detection is used.

Embodiment 5

While in the embodiment 4 switchover of switching units is effected when a system fault is detected by using a circuit which detects a system fault by monitoring a system voltage or a circuit which detects a system fault by monitoring a difference between a current command of the converter and a current actually detected, a control device in the embodiment 5 extracts a negative-phase-sequence component to effect switchover of switching units in accordance with the extracted negative-phase-sequence component as in the embodiment 2.

FIG. 7 is a block diagram showing a negative-phase-sequence component extractor in a control device of a power conversion equipment according to the embodiment 5. As shown in FIG. 7, the negative-phase-sequence component extractor 14 in the embodiment 5 includes, in addition to the negative-phase-sequence component extractor shown in FIG. 6, third and fourth negative-phase-sequence component extraction filters 141, 142, multipliers 143, 144, an adder 145, a square-root computing unit 146, an absolute value converter 147, and a comparator 148. Also, a filter switching command circuit 139 outputs a switching command in accordance with an output signal from the comparator 148. The embodiment 5 is the same as the embodiment 4 in other respects.

The third and fourth negative-phase-sequence component extraction filters 141, 142 may be the same as those in the embodiment 2. Also, switchover of the filters may be made in the same manner as in the embodiment 2.

In this embodiment, switchover of the negative-phase-sequence component extraction filters is made in accordance with a negative-phase-sequence voltage. Therefore, it is possible, in addition to the effect obtained in the embodiment 4, to constitute a control system, to provide the control device which is free of malfunctioning at the time of an unbalanced fault and has a high speed of response when an unbalanced fault occurs in the system.

Embodiment 6

While in the embodiment 5, there are newly provided the third and fourth negative-phase-sequence component extraction filters for judging a change from the steady state to the transient state, a control device in the embodiment 6 uses the first and second negative-phase-sequence component extraction filters to judge the change of the state, thus reducing the number of filters.

FIG. 8 is a block diagram showing a negative-phase-sequence component extractor in a control device of a power conversion equipment according to the embodiment 6. As shown in FIG. 8, like the embodiment 3, a switching unit 151 (152) effects only connection to and disconnection from the first negative-phase-sequence component extraction filter 131 (133) so that an output from the three phase/two phase transformation reciprocal both phase transformer 11 is always passed through the second negative-phase-sequence component extraction filter 132 (134). Switching actions of the switching units 151, 152 are made so as to be put in a connected state in a steady state and to be put in a non-connected state in a transient state. The embodiment 6 is the same as the embodiment 5 in other respects.

In this manner, it is possible, in addition to the effect obtained in the embodiment 5, to reduce the number of filters as compared with the embodiment 5 to make a constitution simple.

Embodiment 7

While in the embodiments 1 to 6, a negative-phase-sequence component is extracted from a signal transformed by the three phase/two phase transformation reciprocal both phase transformer, an explanation will be given to the following embodiments, in which a negative-phase-sequence component is extracted from a signal transformed by a three phase/two phase transformer. A power conversion equipment is the same as that in the embodiment 1 of FIG. 1 except a control device, and so an explanation therefor is omitted.

FIG. 9 is a view showing a control device of a power conversion equipment according to the embodiment 7. As shown in FIG. 9, with the control device of the power conversion equipment according to the embodiment 7, the three phase/two phase transformation reciprocal both phase transformer 11 in the embodiment 1 is replaced by a three phase/two phase positive-phase-sequence transformer 16, output signals of which are input into the negative-phase-sequence component extractor 14, and the two phase/three phase transformation reciprocal both phase transformer 119 in the embodiment 1 is replaced by a two phase/three phase positive-phase-sequence transformer 121. Output signals from the negative-phase-sequence component extractor 14 are added in the adders 114, 118. The embodiment 7 is the same as the embodiment 1 shown in FIG. 2 in other respects.

Figure 10:
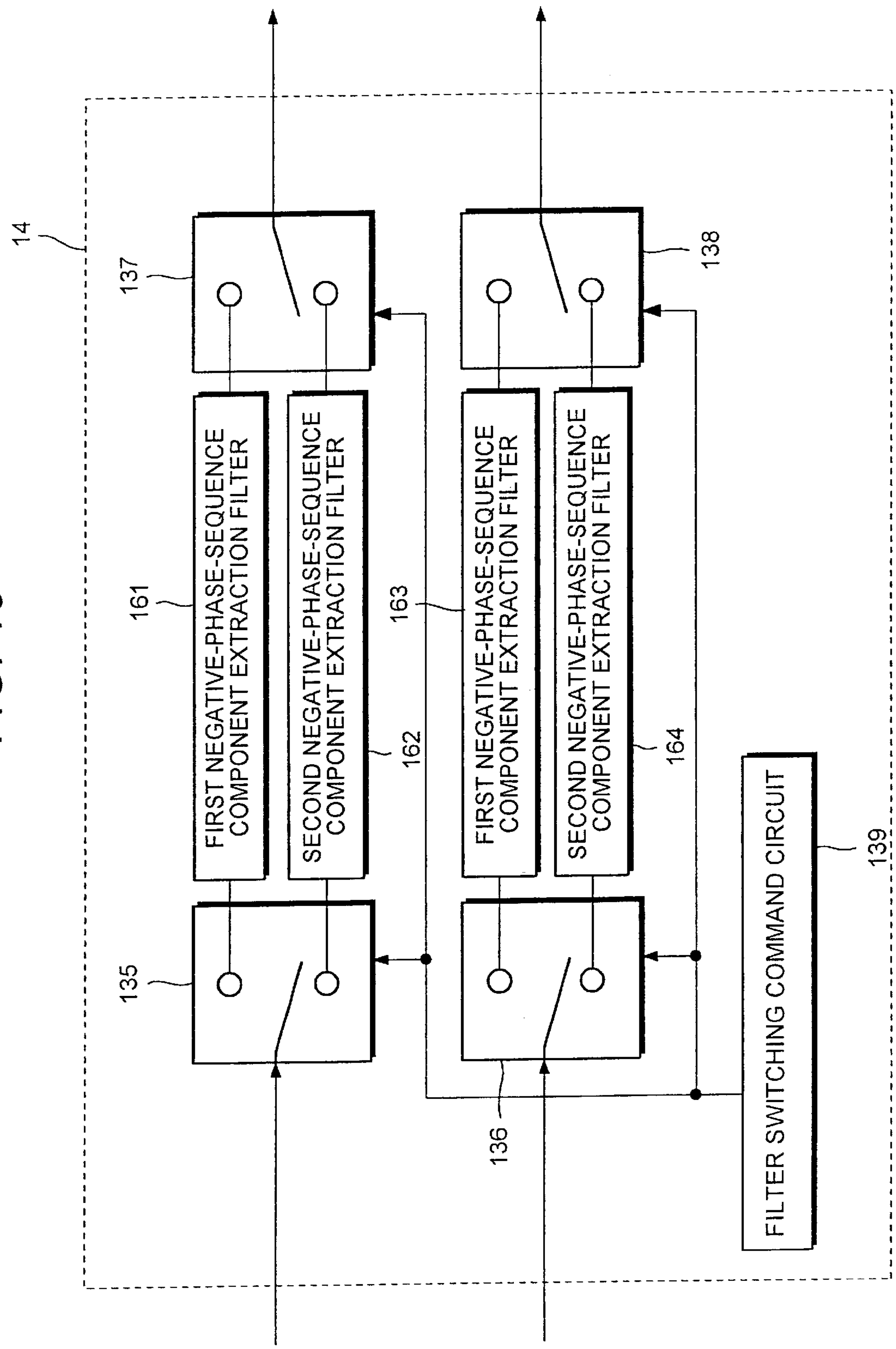
FIG. 10 is a block diagram showing in detail the negative-phase-sequence component extractor shown in FIG. 9.

FIG. 10 is a block diagram showing in detail the constitution of the negative-phase-sequence component extractor 14 shown in FIG. 9. First negative-phase-sequence component extraction filters 161, 163 are ones for steady state, attaching importance to a capability for extracting a negative-phase-sequence component, and second negative-phase-sequence component extraction filters 162, 164 are ones for transient state, which are quicker in speed of response than the negative-phase-sequence component extraction filters for steady state and attach importance to speed of response.

While voltage on the negative-phase-sequence dq-axis serves as an input signal in the negative-phase-sequence component extractor 14 in the embodiment 1, voltage on the positive-phase-sequence dq-axis, which is an output signal of the three phase/two phase positive-phase-sequence transformer 16, serves as an input signal in the negative-phase-sequence component extractor 14 in the embodiment 7. Therefore, a negative-phase-sequence component appears as a double frequency component of a fundamental wave on the positive-phase-sequence dq-axis and a positive-phase-sequence component appears as a current amount thereon. Accordingly, a band pass filter, for example, is preferably used as a filter for extracting such negative-phase-sequence component.

More specifically, it is preferable to use, as negative-phase-sequence component extraction filters for steady state, filters having a characteristic capable of extracting a negative-phase-sequence component with an adequate accuracy by removing components of other frequencies even with poor response so as to enable completely removing a positive-phase-sequence component. It is preferable to use, as negative-phase-sequence component extraction filters for transient state, filters, which have quick speed of response even if being inferior to the negative-phase-sequence component extraction filters for steady state, in a capability of removing a positive-phase-sequence component in order to be increased in speed of response.

In this embodiment, switching of the filters is carried out so that the filters having a high accuracy of detection, that is, the filters for steady state extract a negative-phase-sequence component in steady state and the filters having a high speed of response, that is, the filters for transient state extract a negative-phase-sequence component at the time of sudden change (transient state) in voltage such as a fault in the system. Therefore, it is possible to use the filters of appropriate characteristics in accordance with a state of the system, and to provide the control device which is stable in steady state and has an adequate speed of response at the time of sudden voltage change such as a system fault.

Embodiment 8

While in the embodiment 7, switchover of the switching units is effected if a system fault is detected by using a circuit which detects a fault by monitoring a system voltage or a circuit which detects a fault by monitoring a difference between a current command of the converter and a current actually detected, a control device in the embodiment 8, as in the embodiment 2, extracts a negative-phase-sequence component to effect switchover of the switching units in accordance with the extracted negative-phase-sequence component.

FIG. 11 is a block diagram showing a control device of a power conversion equipment according to the embodiment 8. As shown in FIG. 11, the control device 5 in the embodiment 8 includes, in addition to the control device shown in FIG. 9, a three phase/two phase negative-phase-sequence transformer 17, an output signal of which is input into the negative-phase-sequence component extractor 14.

Figure 12:
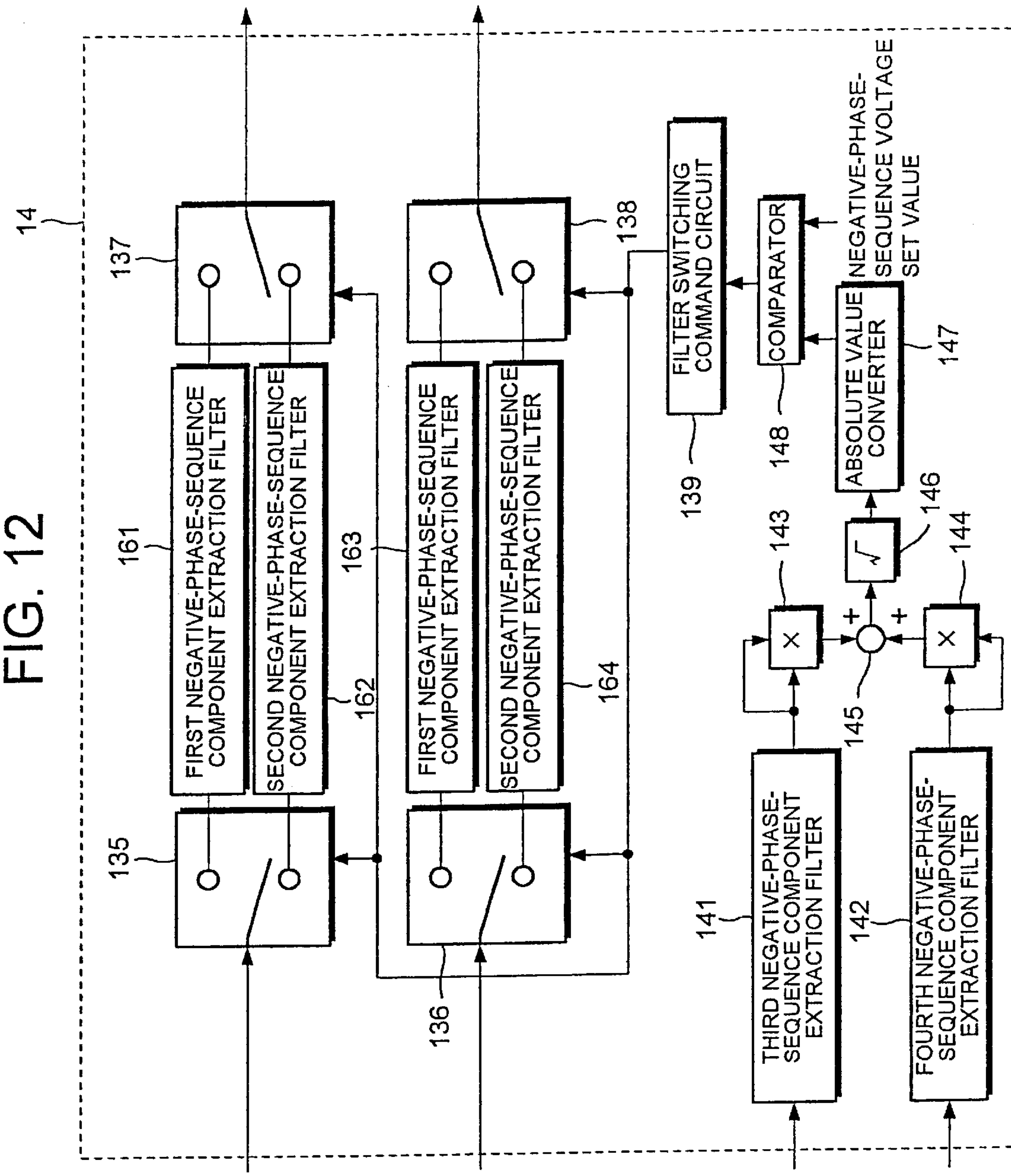
FIG. 12 is a block diagram showing a negative-phase-sequence component extractor in a control device of a power conversion equipment according to an embodiment 8.

FIG. 12 is a block diagram showing a negative-phase-sequence component extractor in a control device of a power conversion equipment according to the embodiment 8. As shown in FIG. 12, the negative-phase-sequence component extractor 14 in the embodiment 8 includes, in addition to the negative-phase-sequence component extractor shown in FIG. 10, third and fourth negative-phase-sequence component extraction filters 141, 142, into which output signals of the three phase/two phase negative-phase-sequence transformer 17 are input, multipliers 143, 144, an adder 145, a square-root computing unit 146, an absolute value converter 147, and a comparator 148. Also, a filter switching command circuit 139 outputs a switching command in accordance with an output signal from the comparator 148. The embodiment 8 is the same as the embodiment 7 in other respects.

The third and fourth negative-phase-sequence component extraction filters 141, 142 may be the same as those in the embodiment 2. Also, switchover of the filters may be made in the same manner as in the embodiment 2.

In this embodiment, switchover of the negative-phase-sequence component extraction filters is made in accordance with a negative-phase-sequence voltage. Therefore, it is possible, in addition to the effect obtained in the embodiment 7, to provide a control device which is free of malfunctioning at the time of an unbalanced fault and has a high speed of response when an unbalanced fault occurs in the system.

Embodiment 9

While in the embodiment 8 there are newly provided the third and fourth negative-phase-sequence component extraction filters for judging a change from the steady state to the transient state, a control device in the embodiment 9 uses the first and second negative-phase-sequence component extraction filters, as in the embodiment 3, to judge the change of the state, thus reducing the number of filters. It is preferable to use the control device shown in FIG. 9 as the control device in this embodiment.

Figure 13:
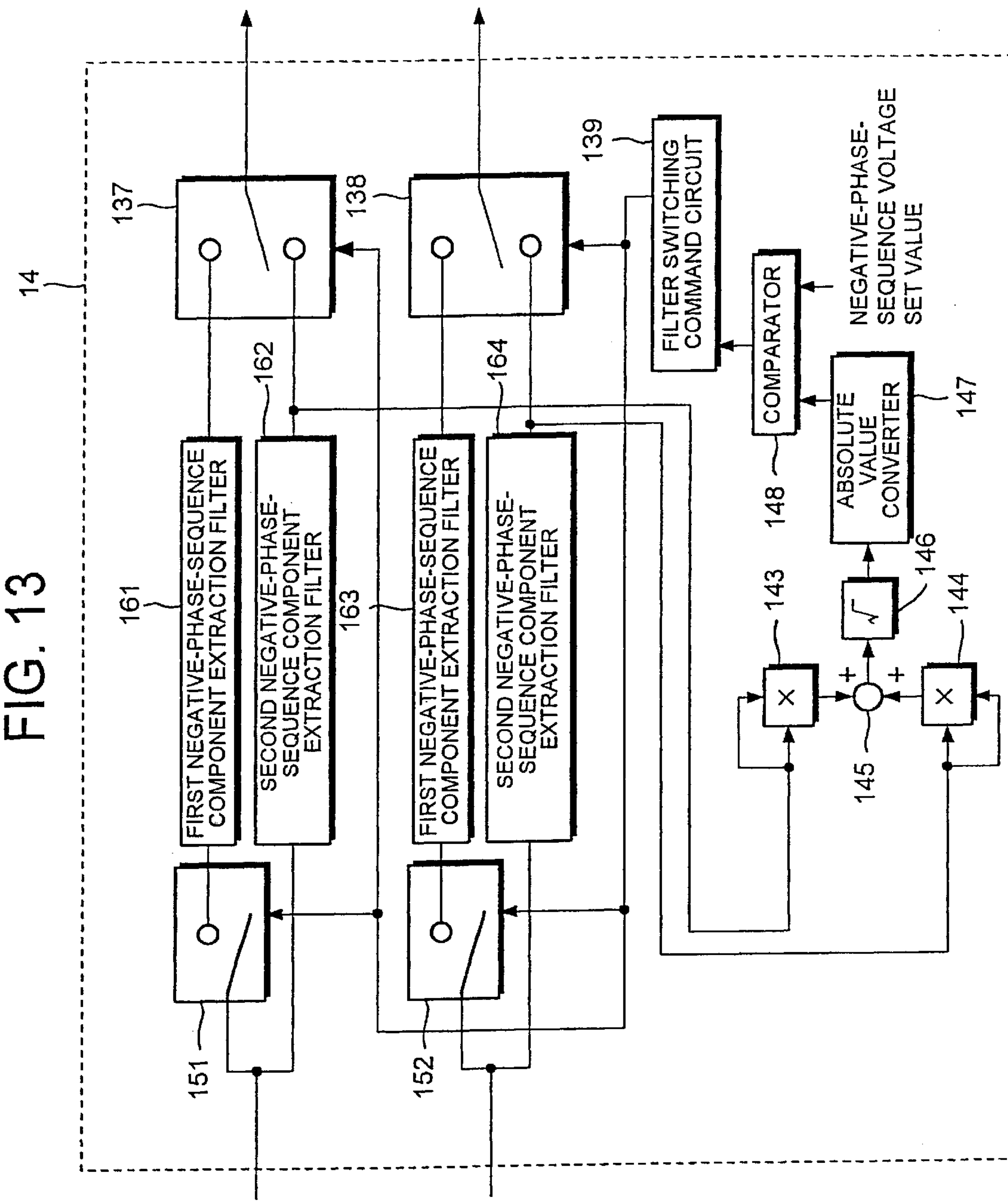
FIG. 13 is a block diagram showing a negative-phase-sequence component extractor in a control device of a power conversion equipment according to an embodiment 9.

FIG. 13 is a block diagram showing a negative-phase-sequence component extractor in a control device of a power conversion equipment according to the embodiment 9. As shown in FIG. 13, like the embodiment 3, a switching unit 151 (152) effects only connection to and disconnection from the first negative-phase-sequence component extraction filter 161 (163) so that an output from the three phase/two phase positive-phase-sequence transformer 16 is always passed through the second negative-phase-sequence component extraction filter 162 (164). Switching actions of the switching units 151, 152 are made so as to be put in a connected state in a steady state and to be put in a non-connected state in a transient state. The embodiment 9 is the same as the embodiment 8 in other respects.

In this manner, it is possible, in addition to the effect obtained in the embodiment 8, to reduce the number of filters as compared with the embodiment 8 to make a constitution further simple.

Embodiment 10

While in the embodiment 7, the second negative-phase-sequence component extraction filters are not used in a steady state and only the first negative-phase-sequence component extraction filters are used to extract a negative-phase-sequence component, a control device in the embodiment 10, as in the embodiment 4, extracts of a negative-phase-sequence component through the first and second negative-phase-sequence component extraction filters in a steady state. It is preferable to use the control device shown in FIG. 9 as the control device in the embodiment 10.

Figure 14:
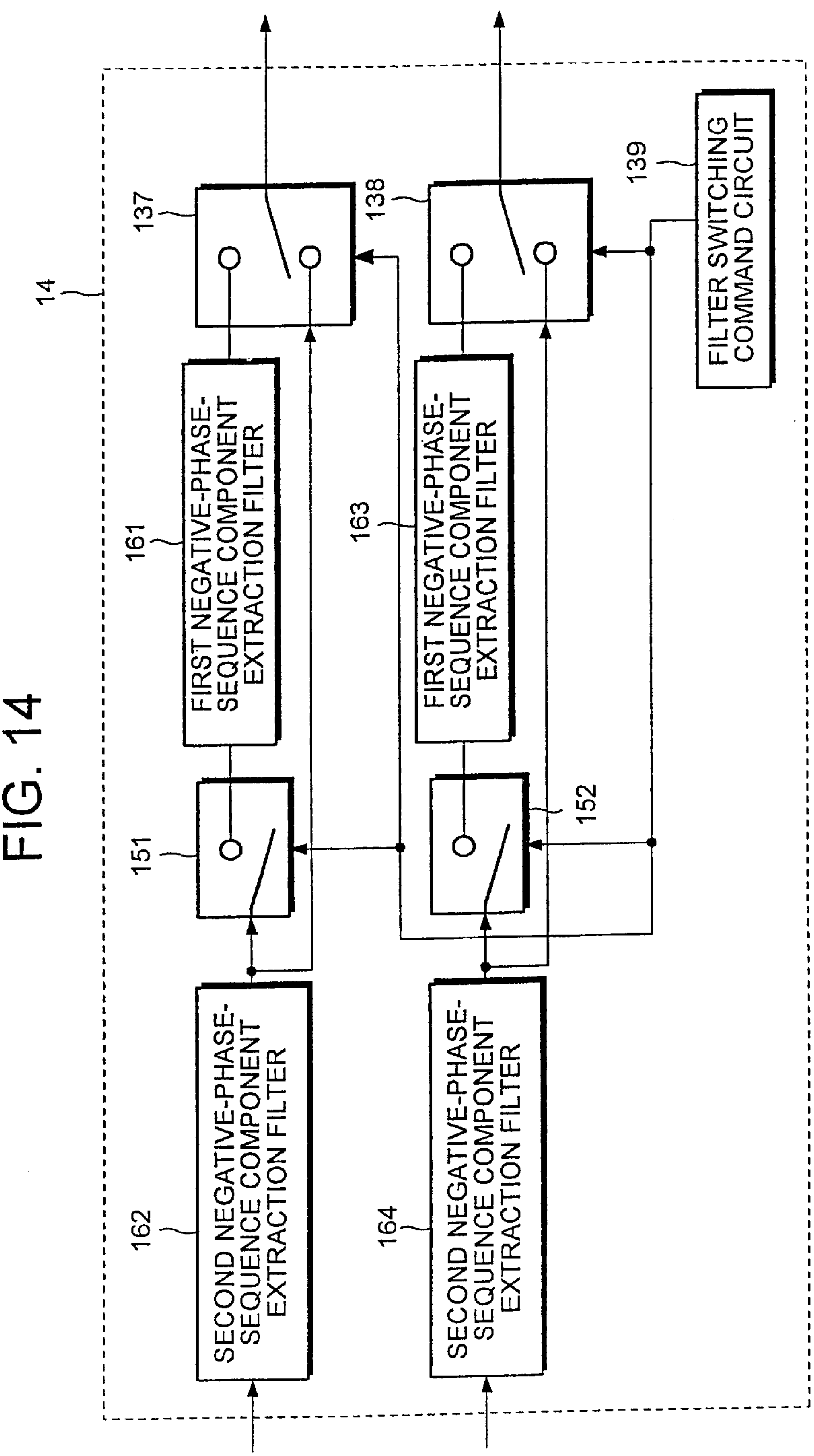
FIG. 14 is a block diagram showing a negative-phase-sequence component extractor in a control device of a power conversion equipment according to an embodiment 10.

FIG. 14 is a block diagram showing a negative-phase-sequence component extractor in a control device of a power conversion equipment according to the embodiment 10. As shown in FIG. 14, a second negative-phase-sequence component extraction filter 162 (164) is connected to a switching unit 151 (152) and to a switching unit 137 (138). As a result, there are ensured a path, along which an output signal from the second negative-phase-sequence component extraction filter 162 (164) is passed to the first negative-phase-sequence component extraction filter 161 (163), and a path, along which the output is input into the switching unit 137 (138) without passing through the first negative-phase-sequence component extraction filter 161 (163). Also, the switching unit in this embodiment is the same in action as that in the embodiment 4. The embodiment 10 is the same as the embodiment 7 in other respects.

Also, the first and second filters may be the same as those in the embodiment 7 to be used. Moreover, it is preferable to use the filters connected in series to be enhanced in the capability of removing a positive-phase-sequence component with a view to enhancing the capability of extracting a negative-phase-sequence component in a steady state.

With this embodiment, both the first and second filters are used for extraction of a negative-phase-sequence component in a steady state. Therefore, it is possible, in addition to the effect obtained in the embodiment 7, to more accurately extract a negative-phase-sequence component in a steady state. Also, since extraction of a negative-phase-sequence component can be made by the first and second filters in combination in a steady state, adequate detection is enabled even when the first filter of somewhat degraded accuracy of detection is used.

Embodiment 11

While in the embodiment 10 switchover of the switching units is effected if a system fault is detected by using a circuit which detects a fault by monitoring a system voltage or a circuit which detects a fault by monitoring a difference between a current command of the converter and a current actually detected, a control device in the embodiment 11, as in the embodiment 5, extracts a negative-phase-sequence component to effect switchover of the switching units in accordance with the extracted negative-phase-sequence component. It is preferable to use the control device shown in FIG. 11 as the control device in the embodiment 11.

FIG. 15 is a block diagram showing a negative-phase-sequence component extractor in a control device of a power conversion equipment according to the embodiment 11. As shown in FIG. 15, the negative-phase-sequence component extractor 14 in the embodiment 11 includes, in addition to the negative-phase-sequence component extractor shown in FIG. 14, third and fourth negative-phase-sequence component extraction filters 141, 142, multipliers 143, 144, an adder 145, a square-root computing unit 146, an absolute value converter 147, and a comparator 148. Also, a filter switching command circuit 139 outputs a switching command in accordance with an output signal from the comparator 148. The embodiment 11 is the same as the embodiment 10 in other respects.

The third and fourth negative-phase-sequence component extraction filters 141, 142 may be the same as those in the embodiment 2. Also, switchover of the filters may be made in the same manner as in the embodiment 2.

In this embodiment, switchover of the negative-phase-sequence component extraction filters is made in accordance with a negative-phase-sequence voltage. Therefore, it is possible, in addition to the effect obtained in the embodiment 10, to provide a control device which is free of malfunctioning at the time of an unbalanced fault and has a high speed of response when an unbalanced fault occurs in the system.

Embodiment 12

While in the embodiment 11, there are newly provided the third and fourth negative-phase-sequence component extraction filters for judging a change from the steady state to the transient state, a control device in the embodiment 12 uses the first and second negative-phase-sequence component extraction filters, as in the embodiment 6, to judge the change of the state, thus reducing the number of filters. It is preferable to use the control device shown in FIG. 9 as the control device in this embodiment.

Figure 16:
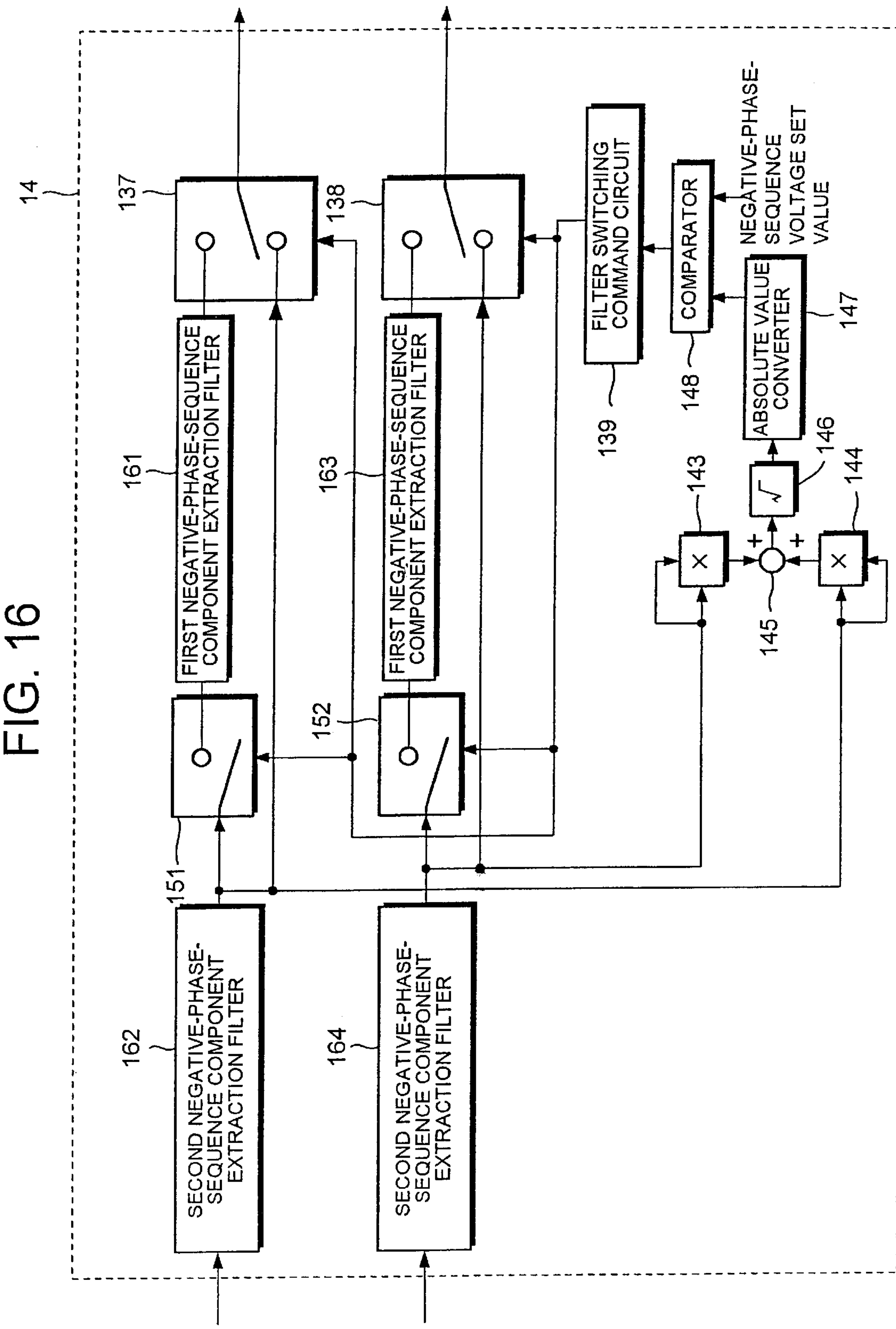
FIG. 16 is a block diagram showing a negative-phase-sequence component extractor in a control device of a power conversion equipment according to an embodiment 12.

FIG. 16 is a block diagram showing a negative-phase-sequence component extractor in a control device of a power conversion equipment according to the embodiment 12. As shown in FIG. 16, like the embodiment 3, a switching unit 151 (152) effects only connection to and disconnection from the first negative-phase-sequence component extraction filter 161 (163) so that an output from the three phase/two phase positive-phase-sequence transformer 16 is always passed through the second negative-phase-sequence component extraction filter 162 (164). Switching actions of the switching units 151, 152 are made so as to be put in a non-connected state in a steady state and to be put in a connected state in a transient state. The embodiment 12 is the same as the embodiment 11 in other respects.

In this manner, it is possible, in addition to the effect obtained in the embodiment 11, to reduce the number of filters as compared with the embodiment 11 to make a constitution further simple.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control device for power conversion equipment comprising:

a three phase/two phase transformer for transforming a three phase AC voltage into a two phase voltage, a positive-phase-sequence component extractor for extracting a positive-phase-sequence component from the two phase voltage, a negative-phase-sequence component extractor including first and second negative-phase-sequence component extraction filters for extracting a negative-phase-sequence component from the two phase voltage using the first negative-phase-sequence component extraction filter in a steady state, and for extracting a negative-phase-sequence component from the two phase voltage using the second negative-phase-sequence component extraction filter in a transient state, and a control signal generator for generating a control signal based on the positive-phase-sequence component extracted by the positive-phase-sequence component extractor and the negative-phase-sequence component extracted by the negative-phase-sequence component extractor.

2. The control device according to claim 1, wherein the three phase/two phase transformer is a three phase/two phase transformation reciprocal transformer for transforming the three phase AC voltage into a positive-phase-sequence dq-axis component and a negative-phase-sequence dq-axis component, respectively, and the positive-phase-sequence component extractor extracts a positive-phase-sequence component from the positive-phase-sequence dq-axis component and the negative-phase-sequence component extractor extracts a negative-phase-sequence component from the negative-phase-sequence dq-axis component.

3. The control device according to claim 1, wherein the second negative-phase-sequence component extraction filter has a higher response speed than the first negative-phase-sequence component extraction filter.

4. The control device according to claim 1, wherein the negative-phase-sequence component extractor comprises a filter switching unit for switching between the first negative-phase-sequence component extraction filter and the-second negative-phase-sequence component extraction filter based on a negative-phase-sequence voltage.

5. The control device according to claim 4, wherein the second negative-phase-sequence component extraction filter is used to extract a negative-phase-sequence component in the steady state and the filter switching unit switches between the first and second negative-phase-sequence extraction filters based on the negative-phase-sequence voltage extracted by the second negative-phase-sequence component extraction filter.

6. The control device according to claim 1, wherein the negative-phase-sequence component extractor extracts a negative-phase-sequence component in the steady state using the first negative-phase-sequence component extraction filter and the second negative-phase-sequence component extraction filter.

7. The control device according to claim 6, further comprising a bypass path inputting an output signal from the second negative-phase-sequence component extraction filter into the control signal generator without passing through the first negative-phase-sequence component extraction filter and wherein an output signal from the second negative-phase-sequence component extraction filter is input into the first negative-phase-sequence component extraction filter in the steady state and an output signal from the second negative-phase-sequence component extraction filter is input into the control signal generator via the bypass path in the transient state.

8. The control device according to claim 7, further comprising a filter switching unit for switching between the first negative-phase-sequence component extraction filter and the second negative-phase-sequence component extraction filter based on the negative-phase-sequence voltage.

9. A power conversion equipment comprising:

an AC voltage system, a transformer for transforming a system voltage of the AC voltage system, a converter for converting into a DC voltage the AC voltage transformed by the transformer, a DC condenser connected to the converter, an AC voltage sensor for detecting the system voltage, a three phase/two phase transformer for transforming into a two phase voltage the three phase AC voltage of the AC voltage system detected by the AC voltage sensor, a positive-phase-sequence component extractor for extracting a positive-phase-sequence component from the two phase voltage, a negative-phase-sequence component extractor including first and second negative-phase-sequence component extraction filters for extracting a negative-phase-sequence component from the two phase voltage using the first negative-phase-sequence component extraction filter in a steady state, and for extracting a negative-phase-sequence component from the two phase voltage using the second negative-phase-sequence component extraction filter in a transient state, and a control signal generator for generating a control signal based on the positive-phase-sequence component extracted by the positive-phase-sequence component extractor and the negative-phase-sequence, component extracted by the negative-phase-sequence component extractor.

10. The power conversion equipment according to claim 9, wherein the three phase/two phase transformer is a three phase/two phase transformation reciprocal transformer for transforming the three phase AC voltage of the AC voltage system into a positive-phase-sequence dq-axis component and a negative-phase-sequence dq-axis component, respectively, and the positive-phase-sequence component extractor extracts a positive-phase-sequence component from the positive-phase-sequence dq-axis component and the negative-phase-sequence component extractor extracts a negative-phase-sequence component from the negative-phase-sequence dq-axis component.

11. The power conversion equipment according to claim 9, wherein the second negative-phase-sequence component extraction filter has a higher response speed than the first negative-phase-sequence component extraction filter.

12. The power conversion equipment according to claim 9, wherein the negative-phase-sequence component extractor comprises a filter switching unit for switching between the first negative-phase-sequence component extraction filter and the second negative-phase-sequence component extraction filter based on a negative-phase-sequence voltage.

13. The power conversion equipment according to claim 12, wherein the second negative-phase-sequence component extraction filter is used to extract a negative-phase-sequence component in the steady state and the filter switching unit switches between the first and second negative-phase-sequence extraction filters based on the negative-phase-sequence component extracted by the second negative-phase-sequence component extraction filter.

14. The power conversion equipment according to claim 9, wherein the negative-phase-sequence component extractor extracts a negative-phase-sequence component in the steady state using the first negative-phase-sequence component extraction filter and the second negative-phase-sequence component extraction filter.

15. The power conversion equipment according to claim 14, wherein further comprising a bypass path inputting an output signal from the second negative-phase-sequence component extraction filter into the control signal generator without passing through the first negative-phase-sequence component extraction filter and wherein an output signal from the second negative-phase-sequence component extraction filter is input into the first negative-phase-sequence component extraction filter in the steady state and an output signal from the second negative-phase-sequence component extraction filter is input into the control signal generator via the bypass path in the transient state.

16. The power conversion equipment according to claim 15, wherein the negative-phase-sequence component extractor comprises a filter switching unit for switching between the first negative-phase-sequence component extraction filter and the second negative-phase-sequence component extraction filter based on the negative-phase-sequence voltage.

* * * * *